United States Patent
Osamura et al.

(10) Patent No.: US 9,917,926 B2
(45) Date of Patent: Mar. 13, 2018

(54) COMMUNICATION METHOD AND COMMUNICATION SYSTEM

(71) Applicant: KAMOME Engineering, Inc., Tokyo (JP)

(72) Inventors: Kohji Osamura, Tokyo (JP); Akinori Tsuruoka, Tokyo (JP); Takeshi Shiomura, Tokyo (JP)

(73) Assignee: KAMOME Engineering, Inc., Tokyo (JP)

( * ) Notice: Subject to any disclaimer, the term of this patent is extended or adjusted under 35 U.S.C. 154(b) by 0 days.

(21) Appl. No.: 15/405,870

(22) Filed: Jan. 13, 2017

(65) Prior Publication Data

US 2017/0134535 A1    May 11, 2017

Related U.S. Application Data

(63) Continuation of application No. PCT/JP2014/068888, filed on Jul. 16, 2014.

(51) Int. Cl.
   *H04L 29/06* (2006.01)
   *H04L 5/00* (2006.01)

(52) U.S. Cl.
   CPC ............ *H04L 69/16* (2013.01); *H04L 5/0055* (2013.01); *H04L 67/42* (2013.01)

(58) Field of Classification Search
   CPC ........ H04L 69/16; H04L 5/0055; H04L 67/42
   See application file for complete search history.

(56) References Cited

U.S. PATENT DOCUMENTS

| 8,433,293 | B2 * | 4/2013 | Lee ................. H04L 67/26 455/412.1 |
| 8,832,264 | B2 * | 9/2014 | Pauley ............ H04L 63/306 370/428 |

(Continued)

FOREIGN PATENT DOCUMENTS

| JP | 2006-254160 A | 9/2006 |
| JP | 2009-111437 A | 5/2009 |

(Continued)

OTHER PUBLICATIONS

Written Opinion of the International Searching Authority (Form PCT/ISA/237) dated Oct. 14, 2014 in PCT international application PCT/JP2014/068888.

*Primary Examiner* — Jay P Patel
(74) *Attorney, Agent, or Firm* — Metrolexis Law Group, PLLC

(57) ABSTRACT

A client device comprises a connection destination register that transmits a client identifier to an address management device via a first node; a UDP controller that controls a UDP connection upon reception of a TCP connect from an application executer, and a TCP-session controller that establishes, between itself and the application executer, a first TCP connection identified by a connection identifier. A server device comprises a connection destination register that transmits a server identifier to the address management device via a second node; a UDP controller that controls a UDI connection; and a TCP session controller that establishes, between itself and a service provider, a second TCP connection identified by a connection identifier. A UDP connection via the first node and second node can be established between a communication serve processor and a communication client processor.

12 Claims, 14 Drawing Sheets

(56) References Cited

U.S. PATENT DOCUMENTS

| | | |
|---|---|---|
| 9,197,527 B2 * | 11/2015 | Pauley .................. H04L 63/306 |
| 2009/0052435 A1 | 2/2009 | Nakamura et al. |
| 2009/0113203 A1 | 4/2009 | Tsuge et al. |
| 2013/0232251 A1 * | 9/2013 | Pauley .................. H04L 63/306 |
| | | 709/224 |
| 2014/0068081 A1 | 3/2014 | Sazawa et al. |

FOREIGN PATENT DOCUMENTS

| | | |
|---|---|---|
| JP | 2013-126219 A | 6/2013 |
| JP | 2014-049905 A | 3/2014 |

\* cited by examiner

FIG. 4

| PORT NUMBER | CONNECTION-DESTINATION NAME |
|---|---|
| 80 | ID_S |
| ..... | ..... |

| COMMUNICATION-NODE IDENTIFIER | IP ADDRESS:UDP PORT NUMBER |
|---|---|
| ID_C | AD1 : PT1 |
| ID_S | AD2 : PT2 |
| ..... | ..... |

321

COMMUNICATION METHOD AND COMMUNICATION SYSTEM

CROSS REFERENCE TO RELATED APPLICATIONS

This is a continuation application of PCT International Application No. PCT/JP2014/068888 (filed Jul. 16, 2014); the entire contents of which are incorporated herein by reference.

BACKGROUND

1. Technical Field

The present invention relates to a communication method and a communication system that achieve a seamless connection between apparatuses.

2. Related Art

With the development of communication networks in recent years, network address translation (NAT) has been commonly used in view of securing a certain number of IP addresses and ensuring security. Routers and servers equipped with NAT functions relay communications while translating private addresses into global addresses and vice versa.

Also, in some cases, mobile terminals frequently move to different address spaces, and address translation frequently occurs due to the movement. Specifically, in view of increasing the communication speed of mobile terminals, reducing loads in mobile carrier communication, and so on, more and more mobile terminals are now using both mobile carrier communication and Wi-Fi communication. A mobile terminal connects to a Wi-Fi base station when within an area capable of Wi-Fi communication, and connects to a base station for mobile carrier communication when within an area other than Wi-Fi areas. A mobile terminal also switches its connection from a Wi-Fi base station to a different Wi-Fi base station in some cases.

Meanwhile, there have been systems that use both TCP and UDP (see Japanese Patent Application Publication No. 2014-49905, for example) in order to ensure reliable data communication and prevent data delay. In this system described in Japanese Patent Application Publication No. 2014-49905, relay software captures TCP packets from an application, converts the TCP packets into UDP packets, and transfers the data of the UDP packets.

PRIOR ART DOCUMENT

Patent Document

PATENT DOCUMENT 1: Unexamined publication number 2014-49905

SUMMARY

However, problems often arise when a TCP connection is used to implement data communication.

For example, while a server apparatus or a client apparatus connects to a communication network by using an NAT function, the IP address of the apparatus at the connection destination is sometimes changed dynamically. In this case, it is difficult for the apparatus at the connection source to figure out the IP address of the apparatus at the connection destination. Consequently, the apparatus at the connection source fails to establish a TCP connection with the apparatus at the connection destination or a TCP connection therebetween is terminated in some cases.

Also, when a portable, mobile terminal switches between, for example, mobile carrier communication and Wi-Fi communication, its TCP connection is terminated at the time of switching the communication and data is lost in some cases. There are also cases besides the above where a TCP connection is terminated in an unexpected situation for the user.

Also, while the system described in Japanese Patent Application Publication No. 2014-49905 is useful in ensuring reliable data communication and preventing data delay, it is considered to be incapable of achieving a seamless connection for a portable terminal.

It is therefore an object of the present invention to provide a communication method and a communication system that achieve a seamless connection between apparatuses.

Means for Solving the Problems

A first feature of the present invention relates to a communication method used for a communication system including a client apparatus connecting to a communication network via a first node, a server apparatus connecting to the communication network via a second node, and an address management apparatus connecting to the communication network, the client apparatus including an application executer configured to execute an application and a communication client processor configured to relay communication of the application, the server apparatus including a service provider configured to provide a service for the application and a communication server processor configured to relay communication of the service. Specifically, the communication method according to the first feature of the present invention comprises, causing the communication client processor of the client apparatus to transmit a client identifier to the address management apparatus via the first node; causing the communication server processor of the server apparatus to transmit a server identifier to the address management apparatus via the second node; causing the address management apparatus to store, in a storage device, address translation data in which the client identifier and an IP address and an UDP port of the first node are associated with each other and the server identifier and an IP address and an UDP port of the second node are associated with each other; causing the communication client processor of the client apparatus to, upon receipt of a TCP connect from the application executer, transmit the server identifier to the address management apparatus and acquire the IP address and the UDP port of the second node, which are associated with the server identifier; enabling a UDP connection between the communication client processor of the client apparatus and the communication server processor of the server apparatus via the first node and the second node; causing the communication client processor of the client apparatus to transmit a connection request to the server apparatus via the UDP connection; causing the communication server processor of the server apparatus to, upon receipt of the connection request via the second node, transmit a TCP connect to the service provider, receive an Ack from the service provider, and transmit a connection response containing the Ack and a connection identifier to the first node via the UDP connection; causing the communication client processor of the client apparatus to transmit the Ack and the connection identifier to the application executer upon receipt of the connection response from the communication server processor of the server apparatus via the first node; and establishing a first TCP connection identified by the connection identifier between the communication client processor and the application executer of the client apparatus and establishing a second TCP connection identified by the connection identifier between the communication server processor and the service provider of the server apparatus.

Here, the communication method may be further comprise, causing the communication server processor of the server apparatus to attach a control header containing the connection identifier to downlink data and transmit the downlink data with the control header to the communication client processor of the client apparatus via the UDP connection; and causing the communication client processor of the client apparatus to transmit the downlink data to the application executer via the first TCP connection, attach a control header containing the connection identifier to an acknowledgement of reception of the downlink data, and transmit the reception acknowledgement with the control header to the communication server processor of the server apparatus via the UDP connection.

Moreover, the communication method may be further comprise, when the client apparatus connects to a third node, causing the communication client processor of the client apparatus to transmit the client identifier to the address management apparatus via the third node; causing the address management apparatus to store, in the storage device, address translation data in which the client identifier and an IP address and an UDP port of the third node are associated with each other; causing the communication server processor of the server apparatus to transmit the client identifier to the address management apparatus and acquire the IP address and the UDP port of the third node, which are associated with the client identifier, if the communication server processor of the server apparatus does not receive the reception acknowledgement from the communication client processor of the client apparatus after transmitting the downlink data; enabling a new UDP connection between the communication client processor of the client apparatus and the communication server processor of the server apparatus via the third node and the second node; and causing the communication server processor of the server apparatus to attach a control header containing the connection identifier to the downlink data and transmit the downlink data with the control header to the communication client processor of the client apparatus via the new UDP connection.

Furthermore, the communication method may be further comprise, causing the communication server processor of the server apparatus to encrypt the downlink data and transmit the encrypted downlink data to the communication client processor of the client apparatus; and causing the communication client processor of the client apparatus to decrypt the encrypted downlink data and transmit the decrypted downlink data to the application executer.

Furthermore, the communication method may be further comprise, in a case of dividing the downlink data into a plurality of packets and transmitting the packets, causing the communication server processor of the server apparatus to put sequence numbers in the control headers of the packets, the sequence numbers identifying an order of the respective packets; and causing the communication client processor of the client apparatus to sequentially receive the plurality of packets and, if an unreceived packet is present, transmit the sequence number of the unreceived packet to the communication server processor of the server apparatus to request retransmission.

A second feature of the present invention relates to a communication system comprising a client apparatus connecting to a communication network via a first node; a server apparatus connecting to the communication network via a second node; and an address management apparatus connecting to the communication network. Specifically, in the communication system according to the second feature of the present invention, the client apparatus includes an application executer configured to execute an application and a communication client processor configured to relay communication of the application, the server apparatus includes a service provider configured to provide a service for the application and a communication server processor configured to relay communication of the service, the communication client processor of the client apparatus includes a connection-destination register configured to transmit a client identifier to the address management apparatus via the first node and causes the address management apparatus to associate the client identifier and an IP address and an UDP port of the first node with each other, a UDP controller configured to, upon receipt of a TCP connect from the application executer, transmit a server identifier to the address management apparatus and acquire an IP address and an UDP port of the second node which are associated with the server identifier, after a UDP connection is established between the communication client processor of the client apparatus and the communication server processor of the server apparatus via the first node and the second node, transmit a connection request to the server apparatus via the UDP connection, and receive a connection response containing an Ack for the TCP connect and a connection identifier from the communication server processor of the server apparatus via the first node, and a TCP-session controller configured to transmit the Ack and the connection identifier to the application executer to establish a first TCP connection identified by the connection identifier between the communication client processor and the application executer, and the communication server processor of the server apparatus includes a connection-destination register configured to transmit the server identifier to the address management apparatus via the second node and cause the address management apparatus to associate the server identifier and the IP address and the UDP port of the second node with each other, a UDP controller configured to, upon receipt of the connection request via the second node after the UDP connection is enabled between the communication server processor of the server apparatus and the communication client processor of the client apparatus via the first node and the second node, transmit a TCP connect to the service provider, receive an Ack from the service provider, and transmit a connection response containing the Ack and the connection identifier to the first node via the UDP connection, and a TCP-session controller configured to establish a second TCP connection identified by the connection identifier between the communication server processor and the service provider.

Here, the communication system may be such that the UDP controller of the communication server processor attaches a control header containing the connection identifier to downlink data and transmit the downlink data with the control header to the communication client processor of the client apparatus via the UDP connection, and the UDP controller of the communication client processor transmits the downlink data to the application executer via the first TCP connection, attach a control header containing the connection identifier to an acknowledgement of reception of the downlink data, and transmits the reception acknowledgement with the control header to the communication server processor of the server apparatus via the UDP connection.

Moreover, the communication system may be such that, when the client apparatus connects to a third node, the connection-destination register of the communication client processor transmits the client identifier to the address management apparatus via the third node and causes the address management apparatus to associate the client identifier and an IP address and an UDP port of the third node with each other, the UDP controller of the communication server processor transmits the client identifier to the address management apparatus and acquires the IP address and the UDP port of the third node, which are associated with the client identifier, if the UDP controller of the communication server processor does not receive the reception acknowledgement from the communication client processor of the client apparatus after transmitting the downlink data, and, after a new UDP connection is enabled between the communication client processor of the client apparatus and the communication server processor of the server apparatus via the third node and the second node, the UDP controller of the communication server processor attaches a control header containing the connection identifier to the downlink data and transmit the downlink data with the control header to the communication client processor of the client apparatus via the new UDP connection.

Furthermore, the communication system may be such that, the UDP controller of the server apparatus encrypts the downlink data and transmits the encrypted downlink data to the communication client processor of the client apparatus, and the UDP controller of the communication client processor decrypts the encrypted downlink data and transmits the decrypted downlink data to the application executer.

Furthermore, the communication system may be such that, in a case of dividing the downlink data into a plurality of packets and transmitting the packets, the UDP controller of the communication server processor puts sequence numbers in the control headers of the packets, the sequence numbers identifying an order of the respective packets, and the UDP controller of the communication client processor sequentially receives the plurality of packets and, if an unreceived packet is present, transmits the sequence number of the unreceived packet to the communication server processor of the server apparatus to request retransmission.

A third feature of the present invention relates to a communication method used for a communication system including a client apparatus connecting to a communication network via a first node, an application execution apparatus connecting to the client apparatus, a server apparatus connecting to the communication network via a second node, and an address management apparatus connecting to the communication network, the application execution apparatus including an application executer configured to execute an application, the client apparatus including a communication client processor configured to relay communication of the application, the server apparatus including a service provider configured to provide a service for the application and a communication server processor configured to relay communication of the service. Specifically, the communication method according to the third feature of the present invention comprises, causing the communication client processor of the client apparatus to transmit a client identifier to the address management apparatus via the first node; causing the communication server processor of the server apparatus to transmit a server identifier to the address management apparatus via the second node; causing the address management apparatus to store, in a storage device, address translation data in which the client identifier and an IP address and an UDP port of the first node are associated with each other and the server identifier and an IP address and an UDP port of the second node are associated with each other; causing the communication client processor of the client apparatus to, upon receipt of a TCP connect from the application executer, transmit the server identifier to the address management apparatus and acquire the IP address and the UDP port of the second node, which are associated with the server identifier; enabling a UDP connection between the communication client processor of the client apparatus and the communication server processor of the server apparatus via the first node and the second node; causing the communication client processor of the client apparatus to transmit a connection request to the server apparatus via the UDP connection; causing the communication server processor of the server apparatus to, upon receipt of the connection request via the second node, transmit a TCP connect to the service provider, receive an Ack from the service provider, and transmit a connection response containing the Ack and a connection identifier to the first node via the UDP connection; causing the communication client processor of the client apparatus to transmit the Ack and the connection identifier to the application executer upon receipt of the connection response from the communication server processor of the server apparatus via the first node; and establishing a first TCP connection identified by the connection identifier between the communication client processor of the client apparatus and the application executer and establishing a second TCP connection identified by the connection identifier between the communication server processor and the service provider of the server apparatus.

A forth feature of the present invention relates to a communication system comprising a client apparatus connecting to a communication network via a first node; an application execution apparatus connecting to the client apparatus; a server apparatus connecting to the communication network via a second node; and an address management apparatus connecting to the communication network. Specifically, in the communication system according to the forth feature of the present invention, the application execution apparatus includes an application executer configured to execute an application, the client apparatus includes a communication client processor configured to relay communication of the application, the server apparatus includes a service provider configured to provide a service for the application and a communication server processor configured to relay communication of the service, the communication client processor of the client apparatus includes a connection-destination register configured to transmit a client identifier to the address management apparatus via the first node and causes the address management apparatus to associate the client identifier and an IP address and an UDP port of the first node with each other, a UDP controller configured to, upon receipt of a TCP connect from the application executer, transmit a server identifier to the address management apparatus and acquire an IP address and an UDP port of the second node which are associated with the server identifier, after a UDP connection is established between the communication client processor of the client apparatus and the communication server processor of the server apparatus via the first node and the second node, transmit a connection request to the server apparatus via the UDP connection, and receive a connection response containing an Ack for the TCP connect and a connection identifier from the communication server processor of the server apparatus via the first node, and a TCP-session controller configured to transmit the Ack and the connection identifier to the application executer and establishes a first TCP connection identified by the connection identifier between the communication client processor and the application executer, and the communication server processor of the server apparatus includes a connection-destination register configured to transmit the server identifier to the address management apparatus via the second node and cause the address management apparatus to associate the server identifier and the IP address and an UDP port of the second node with each other, a UDP controller configured to, upon receipt of the connection request via the second node after the UDP connection is enabled between the communication server processor of the server apparatus and the communication client processor of the client apparatus via the first node and the second node, transmit a TCP connect to the service provider, receive an Ack from the service provider, and transmit a connection response containing the Ack and the connection identifier to the first node via the UDP connection, and a TCP-session controller configured to establish a second TCP connection identified by the connection identifier between the communication server processor and the service provider.

Based on the above, the present invention can provide a communication method and a communication system that achieve a seamless connection between apparatuses.

BRIEF DESCRIPTION OF DRAWINGS

FIG. 4 is a diagram illustrating an example of the data structure and the contents of port-connection destination association data in the client apparatus according to the embodiment of the present invention.

FIG. 7 is a diagram illustrating an example of the data structure and the contents of address translation data in the address management apparatus according to the embodiment of the present invention.

DETAILED DESCRIPTION

Figure 1:
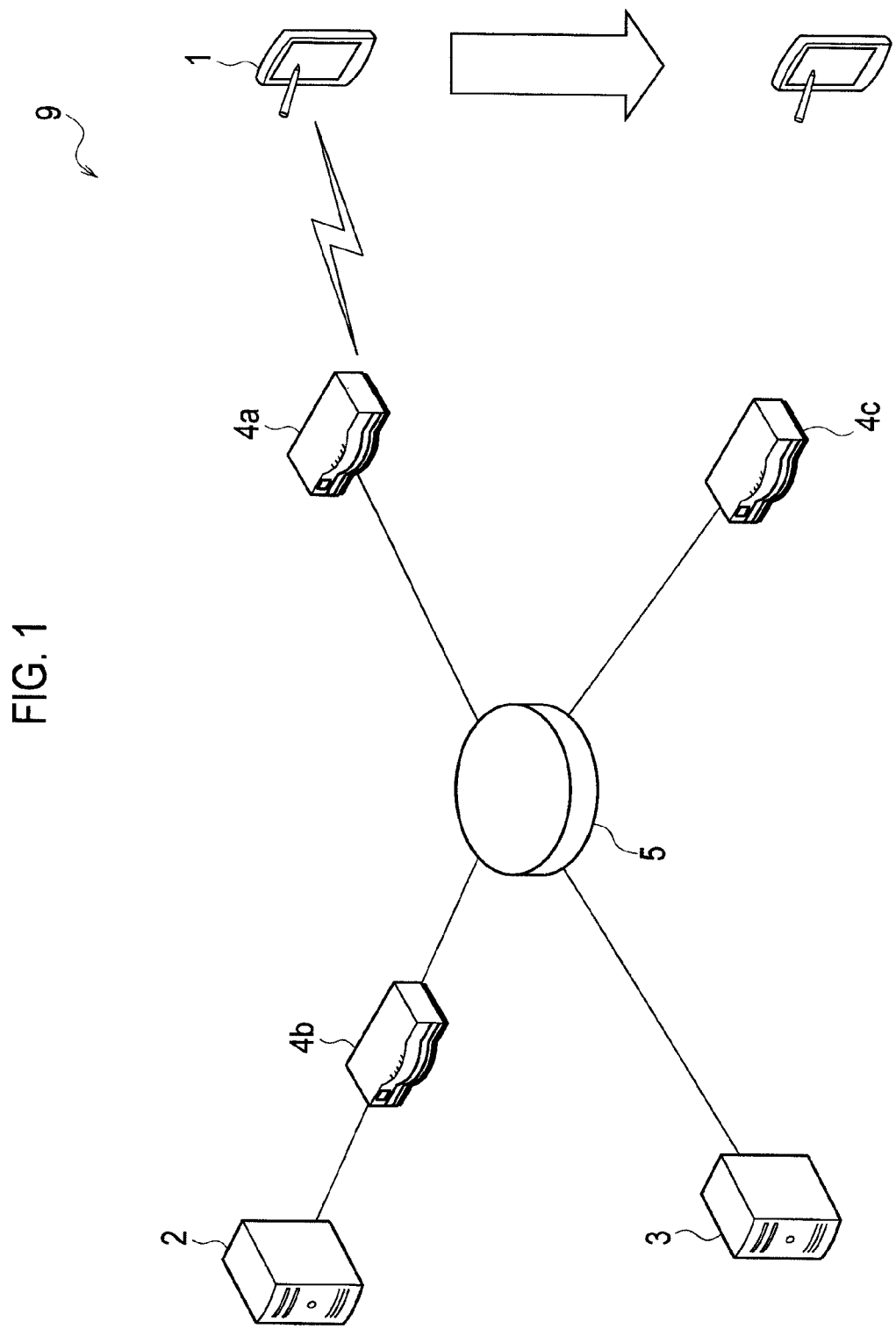
FIG. 1 is a diagram illustrating the system configuration of a communication system according to an embodiment of the present invention.

Next, embodiments of the present invention will be described with reference to the drawings. In the illustration of the following drawings, the same or similar elements are denoted by the same or similar reference signs.

(Communication System)

A communication system 9 according to an embodiment of the present invention will be described with reference to FIG. 1. The communication system 9 includes a client apparatus 1, a server apparatus 2, an address management apparatus 3, a first node 4a, a second node 4b, and a third node 4c. The address management apparatus 3, the first node 4a, the second node 4b, and the third node 4c are communicatively connected to each other by a communication network 5. The client apparatus 1 connects to the communication network 5 via the first node 4a, and the server apparatus 2 connects to the communication network 5 via the second node 4b.

The communication network 5 is the Internet or the like and connects apparatuses to each other communicatively. The apparatuses connected to the communication network 5 in the embodiment of the present invention, namely, the address management apparatus 3, the first node 4a, the second node 4b, and the third node 4c use their global addresses for communication.

The client apparatus 1 is a portable terminal and is in particular a laptop computer, a mobile phone, a smartphone, a tablet, or the like. In the example shown in FIG. 1, the client apparatus 1 connects to the first node 4a, but can connect to, for example, the third node 4c if it is moved. The embodiment of the present invention will describe a case where the client apparatus 1 is portable. Note, however, that a communication method according to the embodiment of the present invention is applicable also to non-portable apparatuses such as a desktop computer.

Applications such as a mail user agent and a browser have been installed in the client apparatus 1. The client apparatus 1 is configured to transmit and receive data to and from the server apparatus 2 when executing an application.

The server apparatus 2 is configured to transmit and receive data to and from the application executed on the client apparatus 1. The server apparatus 2 functions as a mail server in the case where the application in the client apparatus 1 is a mail user agent, and functions as a web server in the case where the application in the client apparatus 1 is a browser.

Note that the description will be given of a case where the server apparatus 2 bears a server function and the client apparatus 1 bears a client function in the example shown in FIG. 1, but this is not the only case. For example, depending on the content of the communication, the mobile client apparatus 1 may bear a server function for the server apparatus 2.

To implement the communication method according to the embodiment of the present invention, the address management apparatus 3 is configured to hold each apparatus' identifier and the address and port number of the node the apparatus connects to in association with each other. When an apparatus changes the node the apparatus connects to, the address management apparatus 3 holds the apparatus' identifier and the address and port number of the new node in association with each other.

The first node 4a is network equipment having an NAT function and is, for example, a gateway server, a router, a base station for mobile carrier communication, a Wi-Fi base station, or the like, and so are the second node 4b and the third node 4c.

The first node 4a is configured to use its private address to communicate with the client apparatus 1 and use its global address to communicate with the communication network 5. Thus, the first node 4a transmits a packet received from the communication network 5 to the client apparatus 1 after address translation into a private address, and transmits a packet received from the client apparatus 1 to the communication network 5 after address translation into a global address.

The second node 4b is configured to use its private address to communicate with the server apparatus 2 and use its global address to communicate with the communication network 5. Thus, the second node 4b transmits a packet received from the communication network 5 to the server apparatus 2 after address translation into a private address, and transmits a packet received from the server apparatus 2 to the communication network 5 after address translation into a global address.

In the example shown in FIG. 1, the first node 4a has a global address "AD1" and a UDP port number "PT1", the second node 4b has a global address "AD2" and a UDP port number "PT2", and the third node 4c has a global address "AD3" and a UDP port number "PT3". Also, the client apparatus has a client identifier "ID_C", and the server apparatus 2 has a server identifier "ID_S".

(Packets)

Packets transmitted and received between the client apparatus 1 and the server apparatus 2 will be described with reference to FIG. 2.

The client apparatus 1 includes an application executer 160 configured to execute applications and a communication client processor 150 configured to relay the communications of the applications. The server apparatus 2 includes a service provider 260 configured to provide a service for an application, and a communication server processor 250 configured to relay the communication of the service.

At the client apparatus 1, a packet P1 containing a TCP header and uplink data is transmitted from the application executer 160 to the communication client processor 150. This TCP header contains a source IP address, a source port number, a destination IP address, and a destination port number. The source is the application executer 160, and the destination is the communication client processor 150.

A packet P2 containing a UDP header, a control header, and the uplink data is transmitted from the communication client processor 150 of the client apparatus 1 to the communication server processor 250 of the server apparatus 2. The communication client processor 150 attaches the control header and the UDP header to the uplink data in the packet P1 and transmits them to the communication server processor 250. The control header is a header for implementing the communication method according to the embodiment of the present invention, and constitutes a part of the UDP payload. The control header contains a connection identifier and a sequence number. The connection identifier is an identifier that identifies a TCP connection to be established between the application executer 160 and the service provider 260. The sequence number is an identifier that identifies the order of the packet. The UDP header is a header for establishing a UDP connection between the communication client processor 150 and the communication server processor 250.

At the server apparatus 2, a packet P3 containing a TCP header and the uplink data is transmitted from the communication server processor 250 and the service provider 260. The communication server processor 250 attaches the TCP header to the uplink data in the packet P2 and transmits them to the service provider 260. This TCP header contains a source IP address, a source port number, a destination IP address, and a destination port number. The source is the communication server processor 250, and the destination is the application executer 160.

The service provider 260 processes the uplink data to generate downlink data. At the server apparatus 2, a packet P4 containing the downlink data and the TCP header is transmitted from the service provider 260 to the communication server processor 250. The communication server processor 250 transmits a packet P5 which is obtained by attaching a UDP header and a control header to the downlink data in the packet P4, to the communication client processor 150. The communication client processor 150 transmits a packet P6 which is obtained by attaching a TCP header to the downlink data in the packet P5, to the application executer 160.

As described above, in the embodiment of the present invention, the application executer 160 and the service provider 260 transmit and receive TCP packets. Also, the communication client processor 150 and the communication server processor 250 transmit and receive UDP packets in each of which is attached a connection identifier that identifies a TCP connection.

(Client Apparatus)

Figure 3:
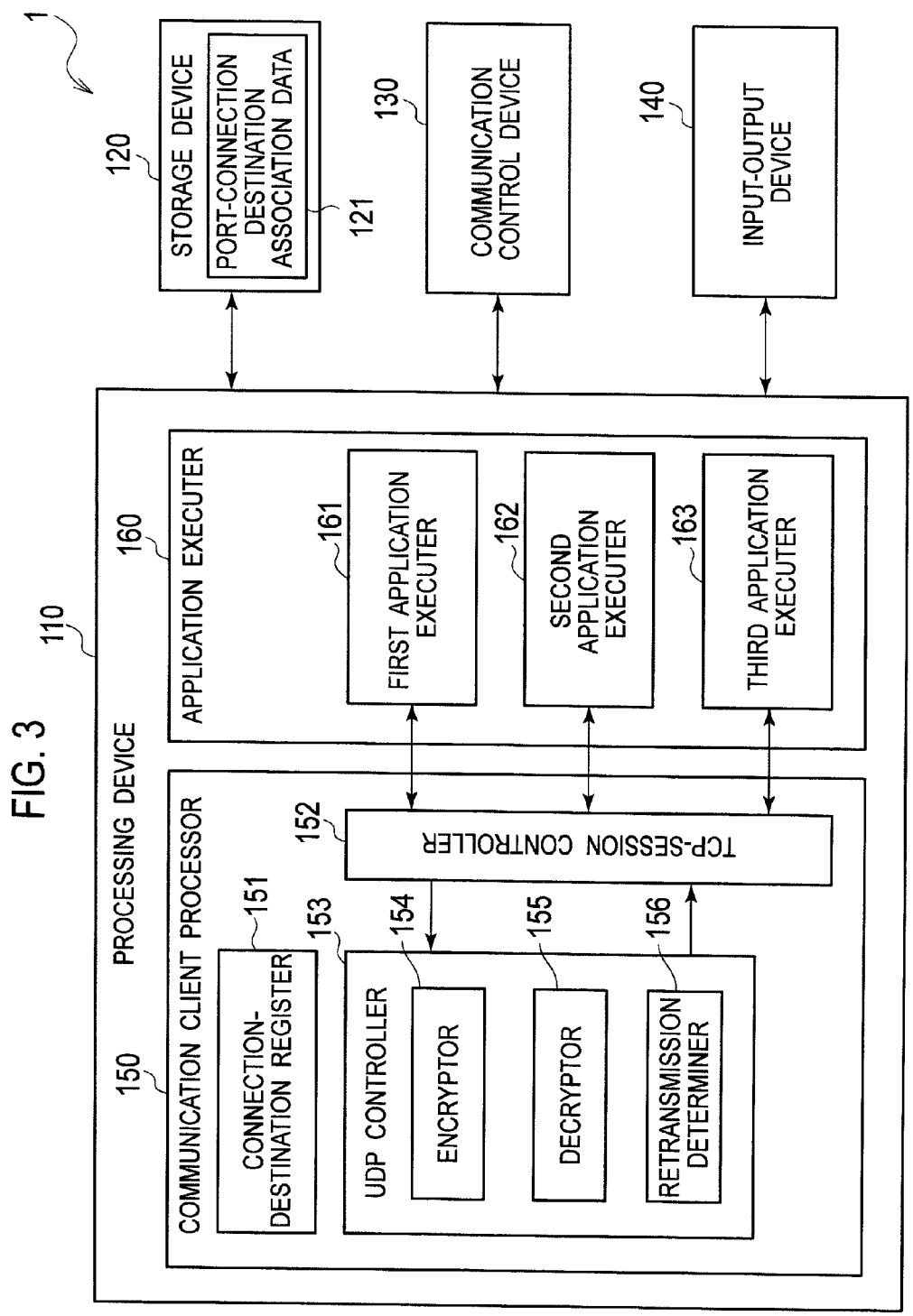
FIG. 3 is a diagram illustrating the hardware configuration and functional blocks of a client apparatus according to the embodiment of the present invention.

The client apparatus 1 according to the embodiment of the present invention will be described with reference to FIG. 3. The client apparatus 1 is a general computer including a processing device 110, a storage device 120, a communication control device 130, and an input-output device 140. This general computer implements the functions shown in FIG. 3 by executing programs for performing predetermined processes.

The storage device 120 stores port-connection destination association data 121. As shown in FIG. 4, the port-connection destination association data 121 is data in which port numbers and server identifiers are associated with each other. One of server identifiers is the server identifier of the server apparatus 2, which serves as a UDP connection destination when the application executer 160 connects to that port number.

The processing device 110 includes the communication client processor 150 and the application executer 160.

The application executer 160 can execute applications with executers, namely a first application executer 161, a second application executer 162, and a third application executer 163. Each application is, when used, connected to the server apparatus 2 via the communication network 5 and is, for example, a mail user agent, browser, or the like. When executing such an application, the application executer 160 designates an IP address and a port number and connects to a TCP-session controller 152 of the communication client processor 150. Here, the port numbers to be designated by the individual applications are set such that the port numbers can be distinguished from one another. The TCP-session controller 152 can identify the server apparatus 2 at the connection destination by referring to the port-connection destination association data 121 with the port number the application executer 160 has connected to.

The communication client processor 150 includes a connection-destination register 151, the TCP-session controller 152, and a UDP controller 153.

The connection-destination register 151 is configured to transmit the client identifier to the address management apparatus 3 via the first node 4a. In response, the address management apparatus 3 stores the client identifier and the IP address and the UDP port of the first node 4a in association with each other.

The connection-destination register 151 is run every time the node which the client apparatus 1 connects to is changed. Specifically, when the client apparatus 1 disconnects from the first node 4a and connects to the third node 4c, the connection-destination register 151 transmits the client identifier to the address management apparatus 3 via the third node 4c. In response, the address management apparatus 3 stores the client identifier and the IP address and the UDP port of the third node 4c in association with each other.

The TCP-session controller 152 is configured to, upon acquisition of a TCP connect from the application executer 160, read the port-connection destination association data 121 and acquire the server identifier of the server apparatus 2 at the connection destination based on the port number which has received the TCP connect. The TCP-session controller 152 transmits the server identifier and the TCP connect to the UDP controller 153. Upon receipt of an Ack for the TCP connect and a connection identifier that identifies a TCP session to be established by the TCP connect from the UDP controller 153, the TCP-session controller 152 transmits the Ack and the connection identifier in a TCP packet to the application executer 160. As a result, a first TCP connection identified by the connection identifier is established between the TCP-session controller 152 and the application executer 160.

The UDP controller 153 is configured to control communication performed via a UDP connection between the communication client processor 150 of the client apparatus 1 and the communication server processor 250 of the server apparatus 2. The UDP controller 153 attaches an UDP header and a control header to data received from the TCP-session controller 152 and transmits them to the first node 4a. Also, the UDP controller 153 attaches a TCP header to data received from the first node 4a and inputs them into the application executer 160.

Specifically, if succeeding in identifying the address and the port number for connecting to the communication server processor 250 of the server apparatus 2 at the connection destination, the UDP controller 153 performs punching or the like to enable a UDP connection between the communication client processor 150 and the communication server processor 250, and performs processing involving that UDP connection. Further, upon receipt of a TCP connect from the application executer 160, the UDP controller 153 transmits the server identifier to the address management apparatus 3 and acquires the IP address and the UDP port of the second node, which has been associated with the server identifier. After the UDP connection between the communication client processor 150 of the client apparatus 1 and the communication server processor 250 of the server apparatus 2 via the first node 4a and the second node 4b is enabled, the UDP controller 153 transmits a connection request to the server apparatus 2 via the UDP connection and receives a connection response containing an Ack for the TCP connect and the connection identifier via the UDP connection from the communication server processor 250 of the server apparatus 2 through the first node 4a. The UDP controller 153 inputs the received connection response to the TCP-session controller 152.

Upon receipt of downlink data from the server apparatus 2, the UDP controller 153 transmits the downlink data to the application executer 160 via the first TCP connection. Further, the UDP controller 153 attaches a control header containing the connection identifier to an acknowledgement of reception of the downlink data and transmits the reception acknowledgement with the control header to the communication server processor 250 of the server apparatus 2 via the UDP connection.

In the case where the node which the client apparatus 1 connects to is changed, the UDP controller 153 performs punching or the like to enable a UDP connection between the communication client processor 150 of the client apparatus 1 and the communication server processor 250 of the server apparatus 2 via the node which the client apparatus 1 has newly connected to.

Further, the UDP controller 153 includes an encryptor 154, a decryptor 155, and a retransmission determiner 156 to provide functions similar to those provided by TCP.

The encryptor 154 is configured to encrypt uplink data inputted from the application executer 160 by a method known to the communication server processor 250 of the server apparatus 2 and transmit the encrypted uplink data. The decryptor 155 is configured to decrypt encrypted downlink data transmitted from the server apparatus 2 and input the decrypted downlink data to the application executer 160.

The retransmission determiner 156 is configured to perform control in a case of dividing data into a plurality of packets and transmitting them, such that the packets are inputted into the application executer 160 in order. Further, the retransmission determiner 156 is configured to, upon receipt of a packet retransmission request from the server apparatus 2, retransmit the retransmission-target packet (s) to the server apparatus 2.

In a case of dividing uplink data into a plurality of packets and transmitting them, the retransmission determiner 156 transmits, to the server apparatus 2, the packets with control headers containing sequence numbers identifying the order or the respective packets, and stores the sequence numbers and the data of the packets in association with each other in the storage device 120. Further, upon receipt of an unreceived sequence number from the server apparatus 2, the retransmission determiner 156 extracts the data corresponding to that sequence number from the storage device 120 and transmits the data to the communication server processor 250 of the server apparatus 2.

In a case of dividing downlink data into a plurality of packets and transmitting them, the retransmission determiner 156 checks the sequence number in the control header of each of packets sequentially received, and determines whether or not an unreceived sequence number is present. If no unreceived sequence number is present, the retransmission determiner 156 inputs the received packets to the application executer 160. On the other hand, if an unreceived sequence number is present, the retransmission determiner 156 transmits the sequence number of the unreceived packet to the communication server processor 250 of the server apparatus 2 to request retransmission.

(Server Apparatus)

Figure 5:
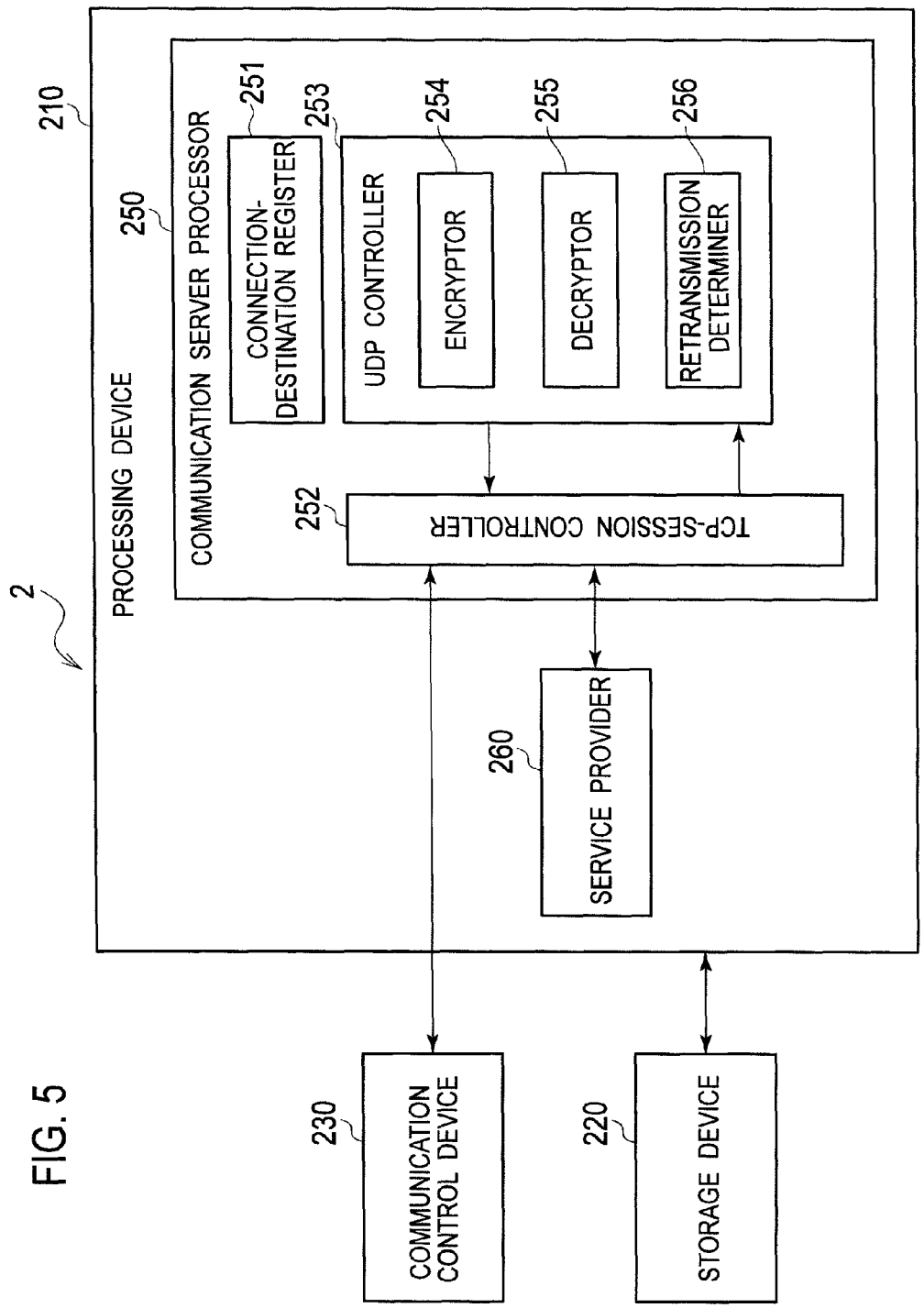
FIG. 5 is a diagram illustrating the hardware configuration and functional blocks of a server apparatus according to the embodiment of the present invention.

The server apparatus 2 according to the embodiment of the present invention will be described with reference to FIG. 5. The server apparatus 2 is a general computer including a processing device 210, a storage device 220, and a communication control device 230. This general computer implements the functions shown in FIG. 5 by executing programs for performing predetermined processes.

The processing device 210 includes the communication server processor 250 and the service provider 260.

The service provider 260 is configured to provide a service to the client apparatus 1 upon receipt of a connection from an application in the client apparatus 1 and in particular implements a mail server function or a web server function.

The communication server processor 250 includes a connection-destination register 251, a TCP-session controller 252, and a UDP controller 253.

The connection-destination register 251 is configured to transmit the server identifier to the address management apparatus 3 via the second node 4b. In response, the address management apparatus 3 stores the server identifier and the IP address and the UDP port of the second node 4b in association with each other. The connection-destination register 251 is run every time the node which the server apparatus 2 connects to is changed.

The TCP-session controller 252 is configured to, upon receipt of a TCP connect to the client apparatus 1 from the UDP controller 253, transmit the TCP connect in a TCP packet to the service provider 260 and allocate a number as a connection identifier. The TCP-session controller 252 is configured to, upon receipt of an Ack for the TCP connect from the service provider 260, input the connection identifier and the Ack into the UDP controller 253. As a result, a second TCP connection identified by the connection identifier is established between the TCP-session controller 252 and the service provider 260.

The UDP controller 253 is configured to control communication performed via a UDP connection between the communication server processor 250 of the server apparatus 2 and the communication client processor 150 of the client apparatus 1. The UDP controller 253 attaches an UDP header and a control header to data received from the TCP-session controller 252 and transmits them to the second node 4b. Also, the UDP controller 253 attaches a TCP header to data received from the second node 4b and inputs them into the service provider 260.

Specifically, if succeeding in identifying the address and the port number for connecting to the communication client processor 150 of the client apparatus 1 at the connection destination, the UDP controller 253 performs punching or the like to enable a UDP connection between the communication server processor 250 and the communication client processor 150, and performs processing involving that UDP connection. Further, the UDP controller 253 transmits a TCP connect to the service provider 260 upon receipt of a connection request via the second node 4b after the UDP connection between the communication server processor 250 of the server apparatus 2 and the communication client processor 150 of the client apparatus 1 via the first node 4a and the second node 4b is enabled. Then, after allocating a number as a connection identifier and receiving an Ack from the service provider 260, the UDP controller 253 transmits a connection response containing the Ack and the connection identifier to the first node 4a via the UDP connection. Further, upon receipt of downlink data from the service provider 260, the UDP controller 253 attaches a control header containing the connection identifier to the downlink data and transmits them to the communication client processor 150 of the client apparatus 1 via the UDP connection.

Further, if the node which the client apparatus 1 connects to is changed due to its movement or the like, the UDP controller 253 of the communication server processor 250 acquires the address and the port number of the new node from the address management apparatus 3. Specifically, the UDP controller 253 transmits the client identifier to the address management apparatus 3 if the UDP controller 253 does not receive a reception acknowledgement after transmitting downlink data. The UDP controller 253 acquires the IP address and the UDP port of the third node 4c, which are now associated with the client identifier. When a new UDP connection between the communication client processor 150 of the client apparatus 1 and the communication server processor 250 of the server apparatus 2 via the third node 4c and the second node 4b is enabled, the UDP controller 253 attaches a control header containing the connection identifier to the downlink data and transmits them to the communication client processor 150 of the client apparatus 1 via the new UDP connection.

Further, the UDP controller 253 includes an encryptor 254, a decryptor 255, and a retransmission determiner 256 to provide functions similar to those provided by TCP.

The encryptor 254 is configured to encrypt downlink data inputted from the service provider 260 by a method known to the communication client processor 150 of the client apparatus 1 and transmit the encrypted downlink data. The decryptor 255 is configured to decrypt encrypted uplink data transmitted from the client apparatus 1 and input the decrypted uplink data to the service provider 260.

The retransmission determiner 256 is configured to perform control in the case of dividing data into a plurality of packets and transmitting them, such that the packets are inputted into the service provider 260 in order. Further, the retransmission determiner 256 is configured to, upon receipt of a packet retransmission request from the client apparatus 1, retransmit the retransmission-target packet(s) to the client apparatus 1.

In the case of dividing uplink data into a plurality of packets and transmitting them, the retransmission determiner 256 checks the sequence number in the control header of each of packets sequentially received, and determines whether or not an unreceived sequence number is present. If no unreceived sequence number is present, the retransmission determiner 256 inputs the received packets into the service provider 260. On the other hand, if an unreceived sequence number is present, the retransmission determiner 256 transmits the sequence number of the unreceived packet to the communication client processor 150 of the client apparatus 1 to request retransmission.

In the case of dividing downlink data into a plurality of packets and transmitting them, the retransmission determiner 256 transmits, to the client apparatus 1, the packets with control headers containing sequence numbers identifying the order or the respective packets, and stores the sequence numbers and the data of the packets in association with each other in the storage device 220. Further, upon receipt of an unreceived sequence number from the client apparatus 1, the retransmission determiner 256 extracts the data corresponding to that sequence number from the storage device 220 and transmits the data to the communication server processor 150 of the client apparatus 1.

(Address Management Apparatus)

Figure 6:
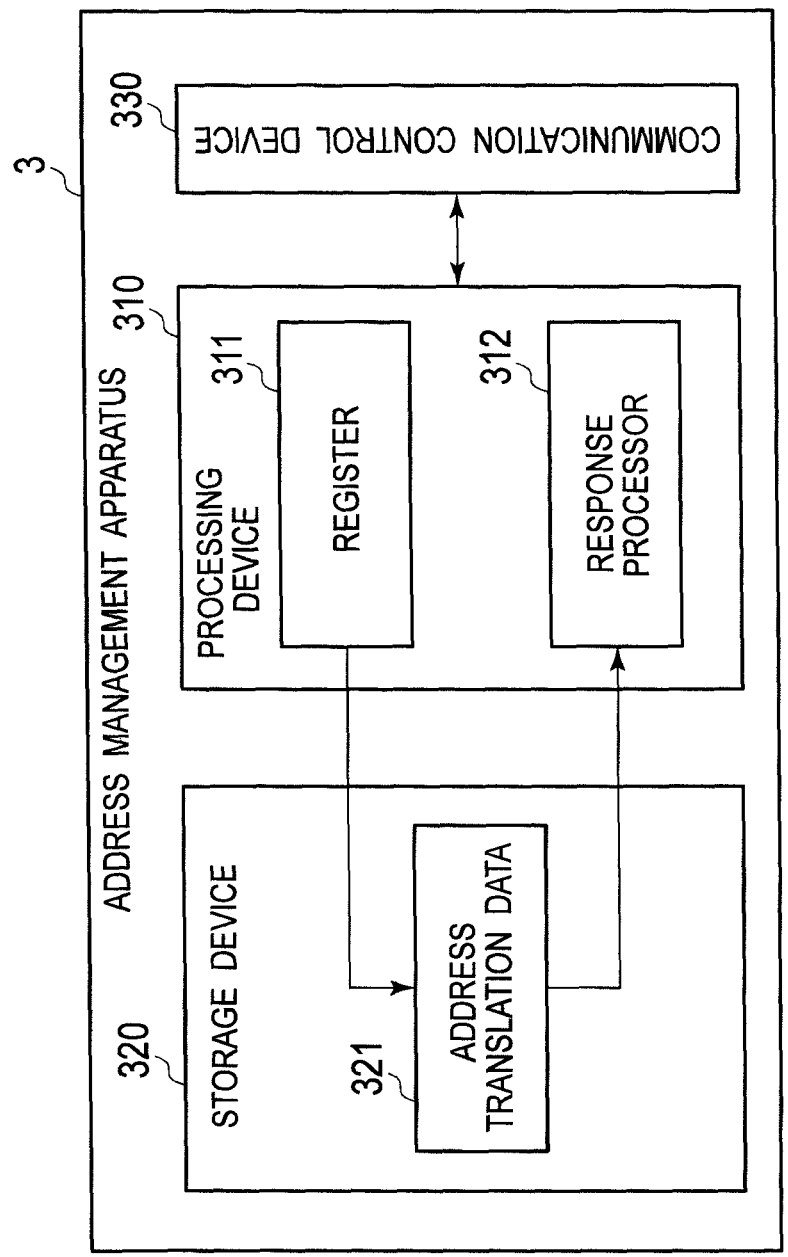
FIG. 6 is a diagram illustrating the hardware configuration and functional blocks of an address management apparatus according to the embodiment of the present invention.

The address management apparatus 3 according to the embodiment of the present invention will be described with reference to FIG. 6. The address management apparatus 3 is a general computer including a processing device 310, a storage device 320, and a communication control device 330. This general computer implements the functions shown in FIG. 6 by executing programs for performing predetermined processes.

The storage device 320 stores address translation data 321. As shown in FIG. 7, the address translation data 321 is data in which the identifier of each communication node and the address and the UDP port number for connecting to the communication node are associated with each other. The "communication node" in the communication system 9 according to the embodiment of the present invention is an apparatus equipped with a communication server processor or a communication client processor for implementing the communication method according to the embodiment of the present invention. On the other hand, the "address and the UDP port number for connecting to the communication node" are the address and the UDP port number of a node which has been given a global address and serves as a destination via which to connect to the communication node.

The processing device 310 includes a register 311 and a response processor 312.

The register 311 is configured to receive a register request from a communication node when the communication node connects to a node which has been given a global address. The register 311 is configured to then store the identifier of the communication node and the address and the UDP port number of the node which has been given a global address, in association with each other in the address translation data 321.

Specifically, when the client apparatus 1 connects to the first node 4*a*, the register 311 receives the identifier "ID_C" of the client apparatus 1 and the IP address "AD1" and the UDP port number "PT1" of the first node 4*a* from the client apparatus 1. Further, the register 311 inserts a record in which these are associated with each other into the address translation data 321. Here, if the client apparatus 1 disconnects from the first node 4*a* and connects to the third node 4*c*, the register 311 receives the identifier "ID_C" of the client apparatus 1 and the IP address "AD3" and the UDP port number "PT3" of the third node 4*c* from the client apparatus 1. Further, the register 311 inserts a record in which these are associated with each other into the address translation data 321. In doing so, the register 311 deletes the previous record of the identifier "ID_C" of the client apparatus 1.

The response processor 312 is configured to, upon receipt of an address inquiry containing the identifier of an inquiry-target communication node from a communication node, return the address and the UDP port number of the inquiry-target communication node.

Specifically, when the client apparatus 1 attempts to connect to the server apparatus 2 at the connection destination, the response processor 312 receives the identifier "ID_S" of the server apparatus 2 from the communication client processor 150 of the client apparatus 1. In this case, the response processor 312 reads the address translation data 321 and returns the IP address "AD2" and the UDP port number "PT2", which correspond to this identifier. Also, if the node which the client apparatus 1 connects to is changed from the first node 4*a* to the third node 4*c* due to its movement and the communication server processor 250 fails data communication with the client apparatus 1 at the connection destination, the response processor 312 receives the identifier "ID_C" of the client apparatus 1 from the communication server processor 250. In this case, the response processor 312 reads the address translation data 321 and returns the latest IP address "AD3" and UDP port number "PT3", which now correspond to this identifier.

(Register Process)

Figure 8:
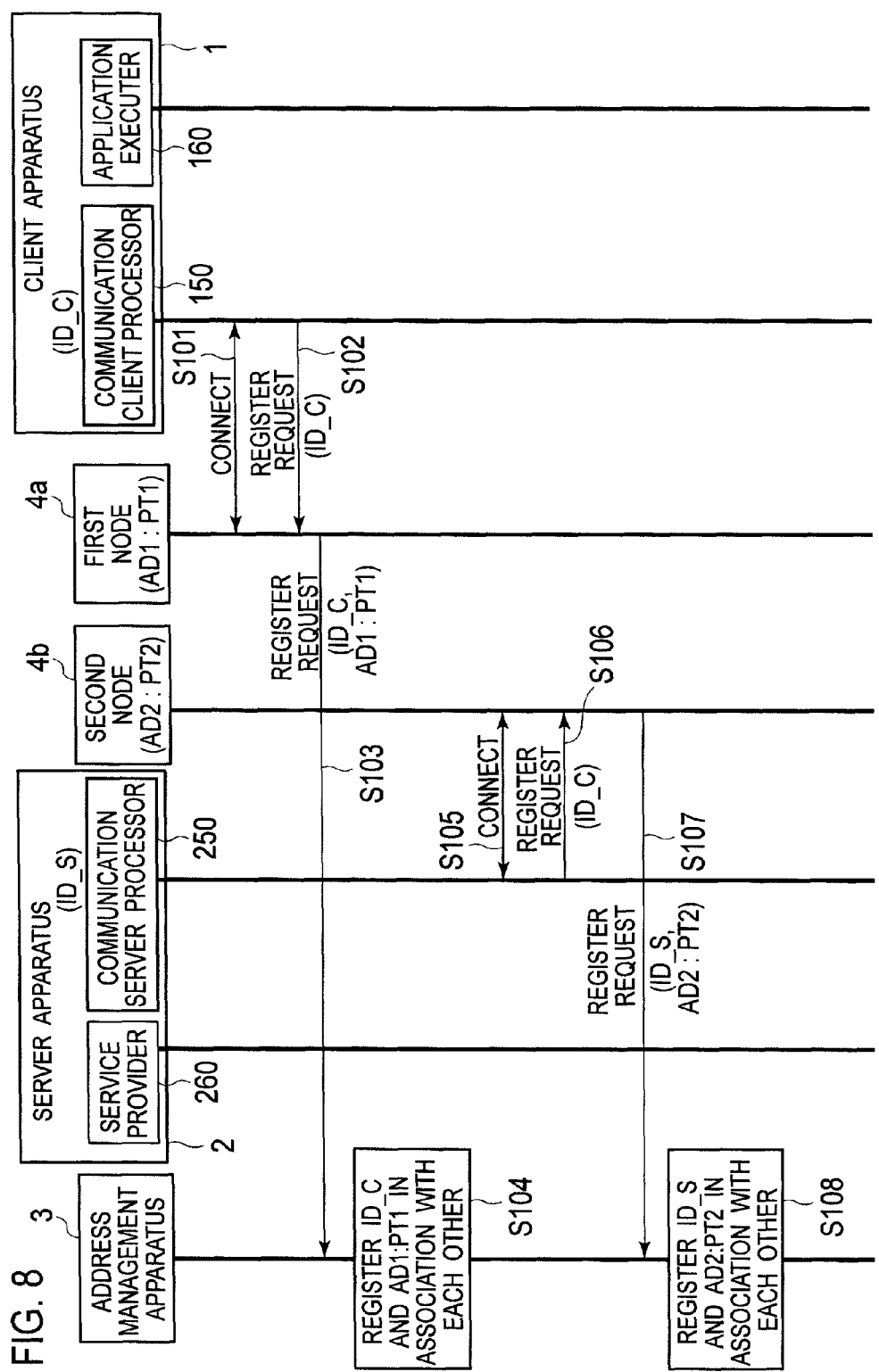
FIG. 8 is a sequence diagram illustrating a register process in a communication method according to the embodiment of the present invention.

A process of registering the client apparatus 1 and the server apparatus 2 in the address management apparatus 3 in the communication system 9 according to the embodiment of the present invention will be described with reference to FIG. 8.

First, when connecting to the first node 4*a* in step S101, the communication client processor 150 of the client apparatus 1 transmits a register request to the first node 4*a* in step S102. Upon receipt of the register request from the client apparatus 1, the first node 4*a* transmits that register request to the address management apparatus 3 in step S103. Here, the register request contains the client identifier "ID_C" of the client apparatus 1 and the IP address "AD1" and the port number "PT1" of the first node 4*a*.

Upon receipt of the register request from the first node 4*a*, the address management apparatus 3 updates the address translation data 321 in step S104. Specifically, the address management apparatus 3 registers the client identifier "ID_C" of the client apparatus 1 and the IP address "AD1" and the port number "PT1" of the first node 4*a*, which are contained in the register request received in step S103, in association with each other in the address translation data 321.

Likewise, when connecting to the second node 4*b* in step S105, the communication server processor 250 of the server apparatus 2 transmits a register request to the second node 4*b* in step S106. Upon receipt of the register request from the server apparatus 2, the second node 4*b* transmits that register request to the address management apparatus 3 in step S107. Here, the register request contains the server identifier "ID_S" of the server apparatus 2 and the IP address "AD2" and the port number "PT2" of the second node 4*b*.

Upon receipt of the register request from the second node 4*b*, the address management apparatus 3 updates the address translation data 321 in step S108. Specifically, the address management apparatus 3 registers the server identifier "ID_S" of the server apparatus 2 and the IP address "AD2" and the port number "PT2" of the second node 4*b*, which are contained in the register request received in step S107, in association with each other in the address translation data 321.

As described above, the address management apparatus 3 holds the client identifier of the client apparatus 1 and the server identifier of the server apparatus 2, and the addresses and the port numbers for these apparatuses to connect to the communication network in association with each other, as shown in FIG. 7. Here, if the node which the client apparatus 1 or the server apparatus 2 connects to is changed, a register request is transmitted again to the address management apparatus 3 based on the new address and port number.

(Connection Process)

Figure 9:
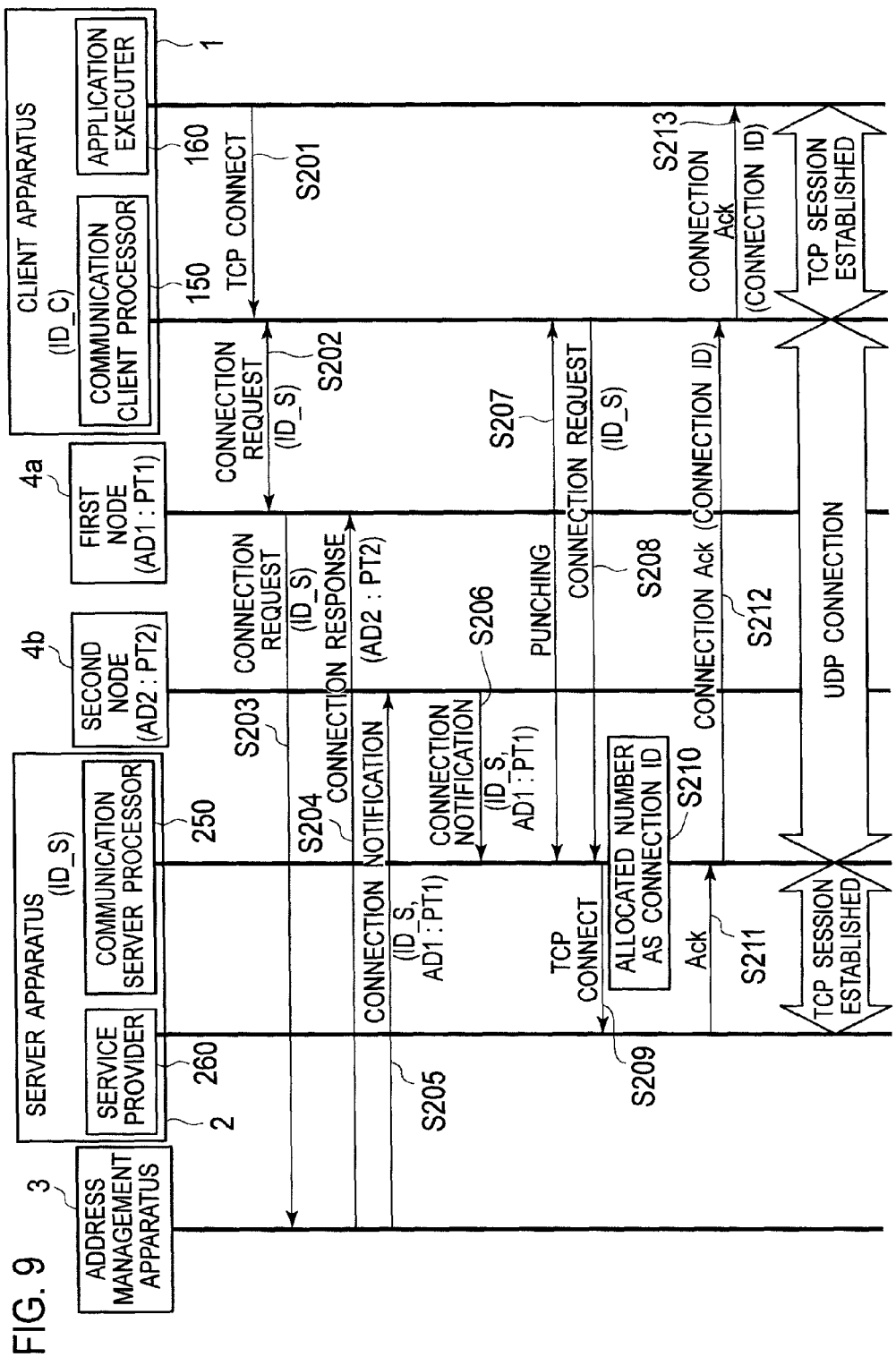
FIG. 9 is a sequence diagram illustrating a connection process in the communication method according to the embodiment of the present invention.

A connection process according to the embodiment of the present invention will be described with reference to FIG. 9. The embodiment of the present invention will describe an example where the client apparatus 1 connects to the server apparatus 2. However, this is not the only case.

First, in step S201, to connect to the server apparatus 2, the application executer 160 transmits a TCP connect to the communication client processor 150. The communication client processor 150 acquires the server identifier "ID_S" of the server apparatus 2 at the connection destination based on the port number which has received the TCP connect from the application executer 160.

In step S202, the communication client processor 150 transmits a connection request containing the identifier "IDS" to the first node 4a. In step S203, the first node 4a transmits the connection request to the address management apparatus 3.

The address management apparatus 3 acquires the address "AD2" and the port number "PT2", which correspond to the identifier "ID_S" in the connection request, and returns them to the first node 4a in step S204.

Further, in step S205, the address management apparatus 3 transmits a connection notification to the corresponding address "AD2". This connection notification is used to notify that there is a connection to be established with the identifier "ID_S", and contains the address "AD1" and the port number "PT1" of the first node 4a, which is the source. The second node 4b, which corresponds to the address "AD2" and the port number "PT2", receives this connection notification, and transmits the connection notification to the communication server processor 250 in step S206. Then, punching or the like is performed between the communication client processor 150 and the communication server processor 250 in step S207, so that UDP communication is enabled therebetween.

Note that the processes in step S205 to step S207 are an example, and any processes may be performed as long as UDP communication can be enabled between the communication client processor 150 and the communication server processor 250. For example, in step S205, the address management apparatus 3 may notify the client apparatus 1 of the address and the port number of the second node 4b, instead of transmitting the connection notification to the second node 4b. In this case, the client apparatus 1 may perform punching or the like for the second node 4b and the server apparatus 2.

After UDP communication is enabled between the communication client processor 150 and the communication server processor 250, the communication client processor 150 transmits a connection request for step S201 to the communication server processor 250 in step S208. This connection request contains the identifier "ID_S" of the communication server processor 250.

Upon receipt of the connection request, the communication server processor 250 transmits a TCP connect to the service provider 260 in step S209. Further, the communication server processor 250 allocates a number as a connection ID in step S210. When the service provider 260 transmits an Ack in step S211 in response to the TCP connect in step S209, the communication server processor 250 transmits a connection response to the communication client processor 150 in step S212 for the connection request in step S208. This connection response contains the connection ID allocated in step S210 and the Ack.

In step S213, the communication client processor 150 transmits the Ack for step S201 to the application executer 160. This Ack contains the connection ID allocated in step S210.

As described above, TCP connections sharing the same connection ID are established between the application executer 160 and the communication client processor 150 and between the communication server processor 250 and the service provider 260. Further, the communication client processor 150 and the communication server processor 250 communicate with each other via a UDP connection.

(Data Transmission-Reception Process)

Figure 10:
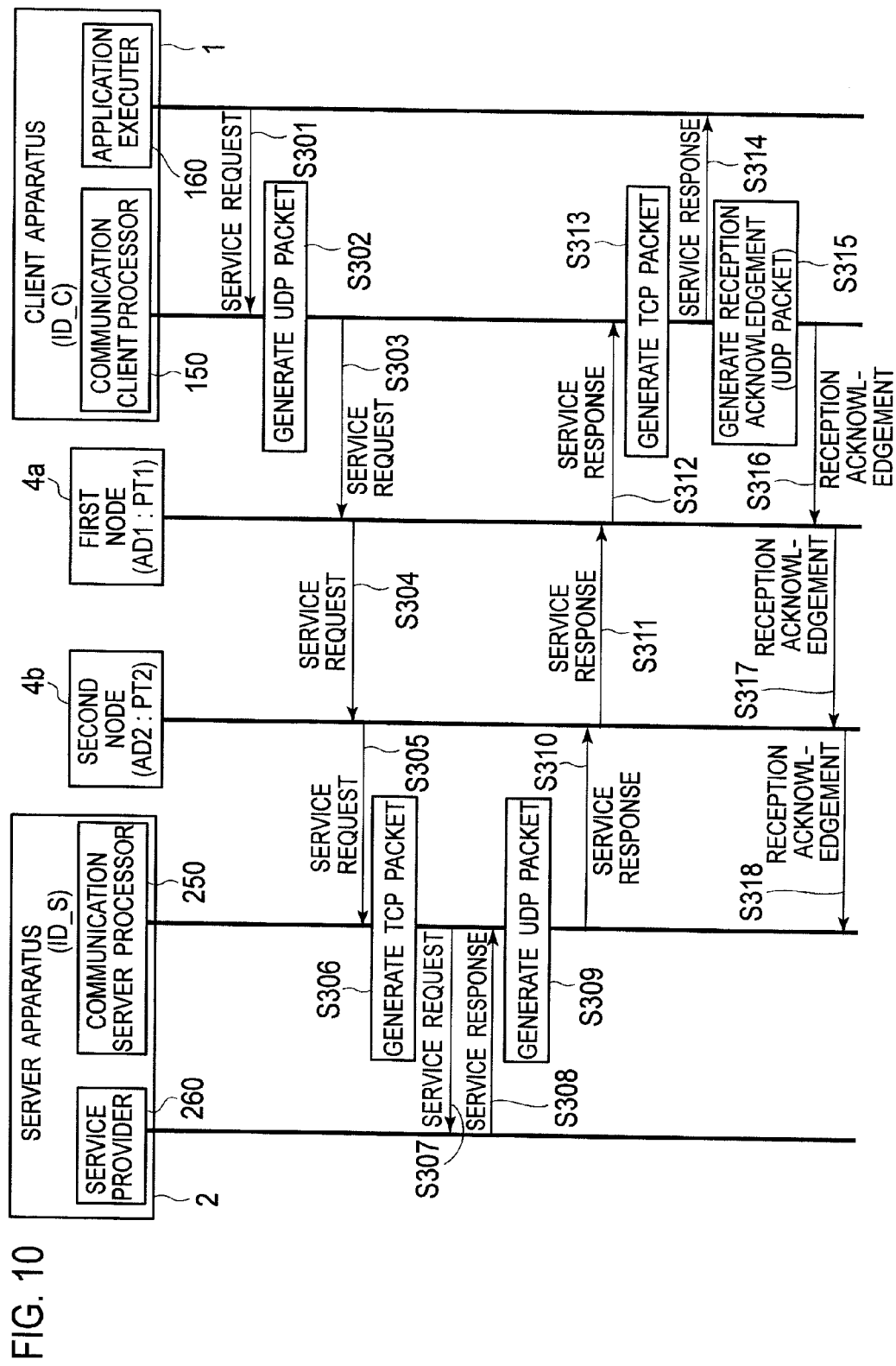
FIG. 10 is a sequence diagram illustrating a data transmission-reception process in the communication method according to the embodiment of the present invention.
Figure 11:
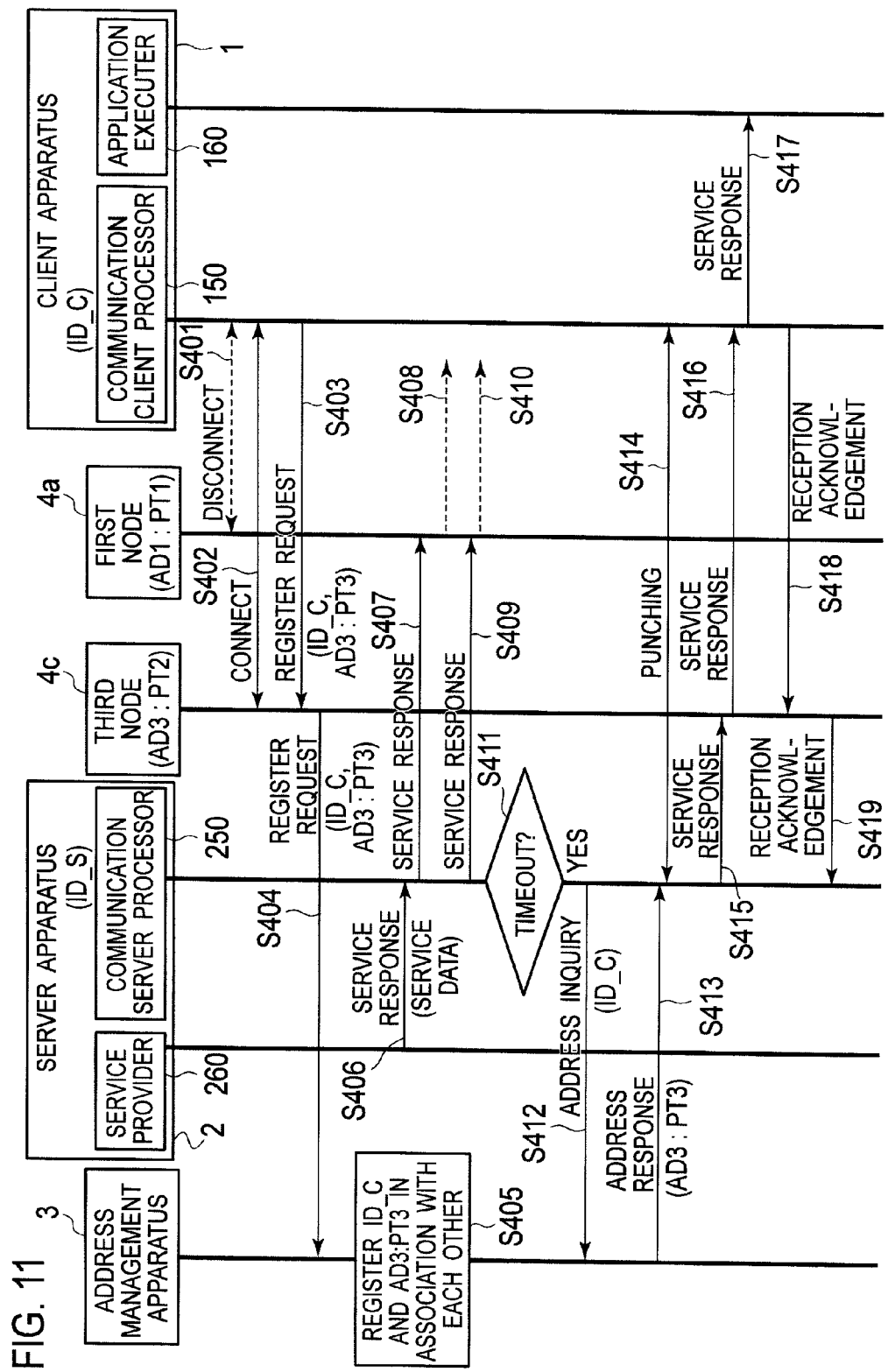
FIG. 11 is a sequence diagram illustrating a data transmission-reception process in the communication method according to the embodiment of the present invention, and is in particular a diagram illustrating a process performed when the client apparatus changes its connection destination.
Figure 12:
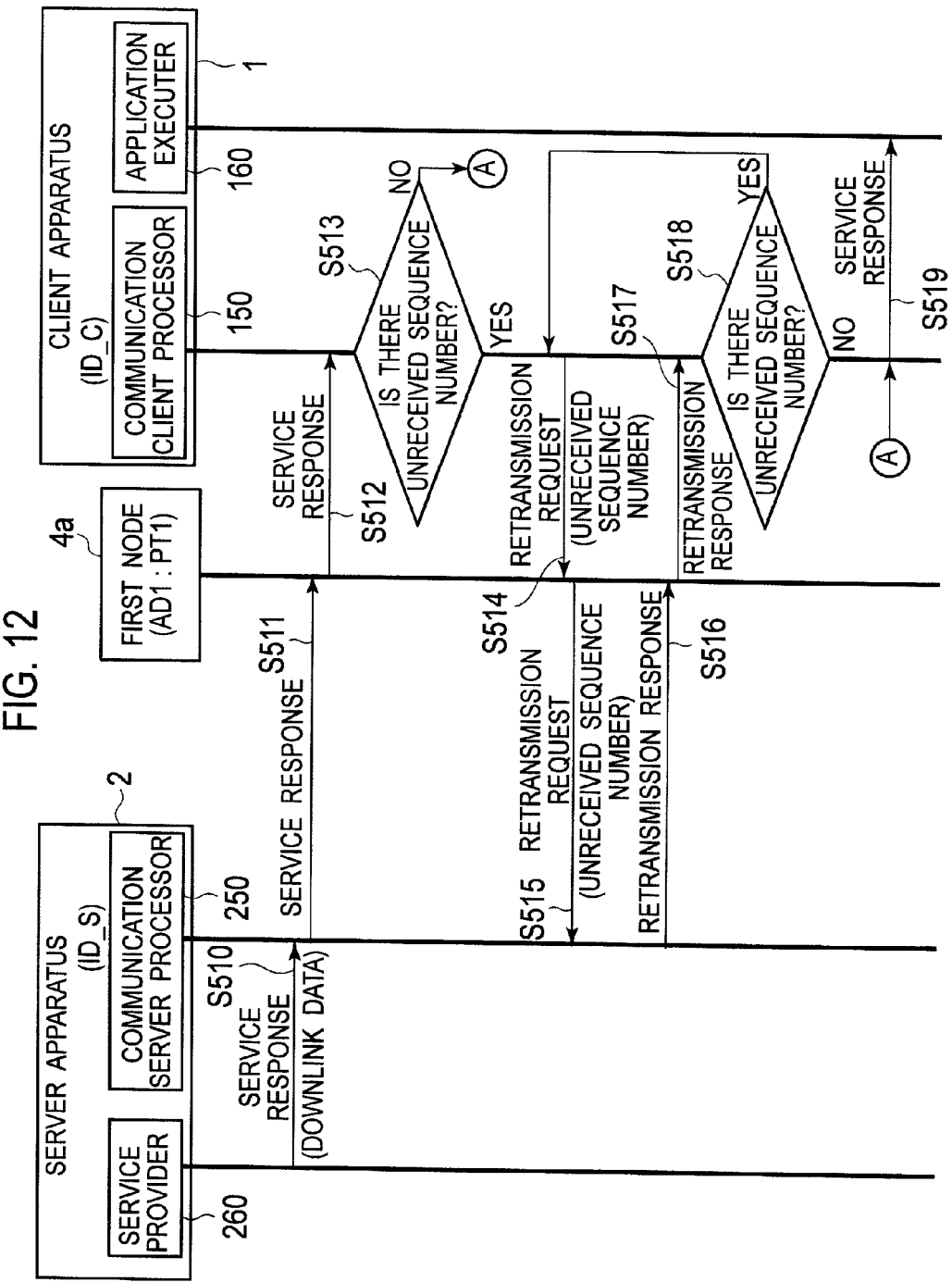
FIG. 12 is a sequence diagram illustrating a data transmission-reception process in the communication method according to the embodiment of the present invention, and is in particular a diagram illustrating flow control.

A process of transmitting and receiving data between the client apparatus 1 and the server apparatus 2 will be described with reference to FIG. 10 to FIG. 12. FIG. 10 illustrates a process in which the client apparatus 1 requests the server apparatus 2 for a service and receives a response to the request from the server apparatus 2 via the TCP sessions and the UDP connection described in the connection process in FIG. 9.

First, in step S301, at the client apparatus 1, the application executer 160 transmits service-request data to the communication client processor 150 by utilizing their TCP session. In step S302, the communication client processor 150 generates a UDP packet from the service request received, and transmits the UDP packet to the first node 4a in step S303. In step S304, the first node 4a transmits the UDP packet to the second node 4b. In step S305, the second node 4b transmits the UDP packet to the communication server processor 250 of the server apparatus 2.

In step S306, at the server apparatus 2, the communication server processor 250 generates a TCP packet from the UDP packet received. In step S307, the communication server processor 250 inputs the service-request data to the service provider 260 by utilizing their TCP session.

In step S308, the service provider 260 inputs service-response data processed based on the service request to the communication server processor 250 by utilizing their TCP session. In step S309, the communication server processor 250 generates a UDP packet from the service-response data received. In step S310, the communication server processor 250 transmits the UDP packet to the second node 4b. In step S311, the second node 4b transmits the UDP packet to the first node 4a. In step S312, the first node 4a transmits the UDP packet to the communication client processor 150 of the client apparatus 1.

In step S313, at the client apparatus 1, the communication client processor 150 generates a TCP packet from the UDP packet received. In step S314, the communication client processor 150 inputs the service-response data into the application executer 160 by utilizing their TCP session.

Further, in step S315, the communication client processor 150 generates a UDP packet as a reception acknowledgement indicating that the service-response data has been received. In step S316, the communication client processor 150 transmits the reception acknowledgement to the first node 4a. In step S317, the first node 4a transmits the reception acknowledgement to the second node 4b. In step S318, the second node 4b transmits the reception acknowledgement to the communication server processor 250 of the server apparatus 2.

A process in which the client apparatus 1 disconnects from the first node 4a due to its movement or the like and connects to the third node 4c will be described with reference to FIG. 11.

When the communication client processor 150 of the client apparatus 1 disconnects from the first node 4a in step S401 and connects to the third node 4c in step S402, the communication client processor 150 transmits a register request to the third node 4c in step S403. Upon receipt of the register request from the client apparatus 1, the third node 4c transmits the register request to that address management apparatus 3 in step S404. Here, the register request contains the client identifier "ID_C" of the client apparatus 1 and the address "AD3" and the port number "PT3" of the third node 4c.

Upon receipt of the register request from the third node 4c, the address management apparatus 3 updates the address translation data 321 in step S405. Specifically, the address management apparatus 3 registers the client identifier "ID_C" of the client apparatus 1 and the address "AD3" and the port number "PT3" of the third node 4c, which are contained in the register request received in step S404, in association with each other in the address translation data 321. In doing so, the information on the first node 4a before the communication client processor 150 connects to the third node 4c is deleted.

On the other hand, the service provider 260 of the server apparatus 2 transmits service-response data to the communication server processor 250 in step S406, and the communication server processor 250 attempts to transmit the service-response data to the client apparatus 1 via the first node 4a in step S407 and step S408. However, since the client apparatus 1 has disconnected from the first node 4a, the service-response data fails to be transmitted to the client apparatus 1.

If the communication server processor 250 does not receive a reception acknowledgement from the communication client processor 150 within a predetermined period of time, the communication server processor 250 attempts to transmit the service-response data to the client apparatus 1 via the first node 4a again in step S409 and step S410.

If the retransmission of the service-response data is repeated but results in a timeout or is determined to have failed a predetermined number of times in step S411, then, the communication server processor 250 inquires of the address management apparatus 3 about the address for the client identifier "ID_C" in step S412. Thereafter, in step S413, the communication server processor 250 acquires the address "AD3" and the port number "PT3" of the third node 4c as the address of the client apparatus 1. Then, in step S414, punching or the like is performed between the communication client processor 150 and the communication server processor 250, so that UDP communication is enabled.

In step S415, the communication server processor 250 transmits the service-response data to the third node 4c. In step S416, the third node 4c transmits the service-response data to the communication client processor 150. The communication client processor 150 transmits the service-response data to the application executer 160 in step S417 and transmits a reception acknowledgement to the third node 4c in step S418. In step S419, the third node 4c transmits the reception acknowledgement to the communication server processor 250 of the server apparatus 2.

As described above, by receiving a reception acknowledgement for transmitted service-response data, the communication server processor 250 can acknowledge that the destination has received the data, even with UDP communication. Also, if failing to receive a reception acknowledgement, the server apparatus 2 inquires of the address management apparatus 3 about the new address and retransmits the data to the new address. In this way, the client apparatus 1 can continue to receive the data even if the client apparatus 1 moves and the global address changes.

Control of the flow of data transmitted from the server apparatus 2 will be described with reference to FIG. 12. FIG. 12 illustrates the process of transmitting service-response data to the communication server processor 250 in step S308 in FIG. 10 and subsequent processes. Although processes involving the second node 4b are not shown in the example shown in FIG. 12, the second node 4b relays communication between the first node 4a and the communication server processor 250 of the server apparatus 2 as in FIG. 10.

In step S510, the service provider 260 of the server apparatus 2 transmits the pieces of service-response data to the communication server processor 250. In step S511, the communication server processor 250 attaches sequence numbers to the pieces of service-response data and transmits them to the first node 4a via the second node 4b. The first node 4a transmits the pieces of service-response data to the communication client processor 150 of the client apparatus 1. Here, the communication server processor 250 stores the transmitted pieces of service-response data and their sequence numbers in association with each other in the storage device 220.

In step S513, the communication client processor 150 checks whether or not an unreceived sequence number is present. If no unreceived sequence number is present, the communication client processor 150 proceeds to step S519, in which the communication client processor 150 transmits the pieces of service-response data to the application executer 160.

On the other hand, if an unreceived sequence number is present, the communication client processor 150 stores the pieces of service-response data received in step S512 in the storage device 120. Further, in step S514, the communication client processor 150 transmits a retransmission request containing the unreceived sequence number to the first node 4a. In step S515, the first node 4a transmits the retransmission request to the communication server processor 250 of the server apparatus 2 via the second node 4b.

Upon receipt of the retransmission request containing the unreceived sequence number in step S515, the communication server processor 250 extracts the piece of service-response data corresponding to that sequence number from the storage device 220. In step S516, the communication server processor 250 transmits a retransmission response containing the extracted piece of data to the first node 4a via the second node 4b. In step S517, the first node 4a transmits the retransmission response to the communication client processor 150 of the client apparatus 1.

In step S518, the communication client processor 150 checks whether or not an unreceived sequence number is present. If no unreceived sequence number is present, the communication client processor 150 proceeds to step S519, in which the communication client processor 150 transmits the pieces of service-response data to the application executer 160. If an unreceived sequence number is present, the communication client processor 150 returns to step S514, in which the communication client processor 150 transmits a retransmission request with the unreceived sequence number set therein.

As described above, in the communication system 9 according to the embodiment of the present invention, a TCP connection is established between the application executer 160 and the communication client processor 150 of the client apparatus 1, and a TCP connection is established between the service provider 260 and the communication server processor 250 of the server apparatus 2. Further, UDP communication is enabled between the communication client processor 150 and the communication server processor 250. Here, a control header containing a connection ID for identifying the TCP connections is set in each UDP packet. Thus, the communication system 9 according to the embodiment of the present invention can relay the TCP connections via the UDP connection.

Further, the address management apparatus 3 holds the identifier of each of the client apparatus 1 and the server apparatus 2 and the global address of the node which the apparatus connects to in association with each other. Thus, even if the address given to the client apparatus 1 or the server apparatus 2 is changed, the TCP session in the client apparatus 1 or the TCP session in the server apparatus 2 is not disconnected, and the connection is maintained. Further, by inquiring of the address management apparatus 3 about the address of the latest node, a new UDP connection can be enabled between the communication client processor 150 and the communication server processor 250.

In this way, even if the address given to the client apparatus 1 or the server apparatus 2 is changed or the node which the client apparatus 1 or the server apparatus 2 connects to is changed, the application executer 160 and the service provider 260 can continue their communication without terminating the TCP connection.

Further, the communication client processor 150 and the communication server processor 250 provide functions similar to those provided by TCP such as encryption and decryption of uplink data and downlink data and flow control. In this way, flexible and reliable communication can be provided utilizing a UDP connection.

(Modification)

Figure 13:
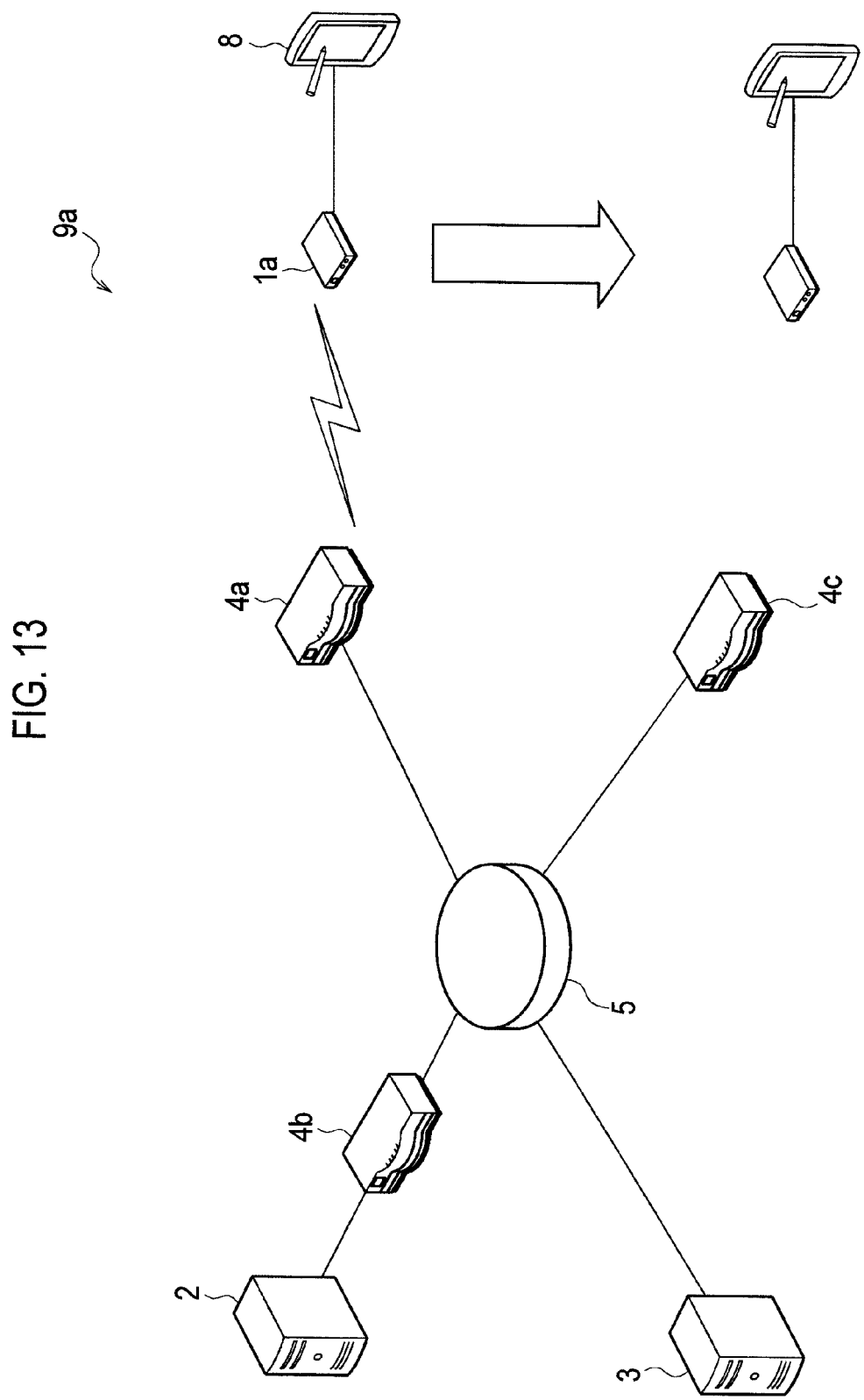
FIG. 13 is a diagram illustrating the system configuration of a communication system according to a modification of the present invention.

A communication system 9a according to a modification of the present invention will be described with reference to FIG. 13. The communication system 9a differs from the communication system 9, described with reference to FIG. 1, in the client apparatus.

Figure 2:
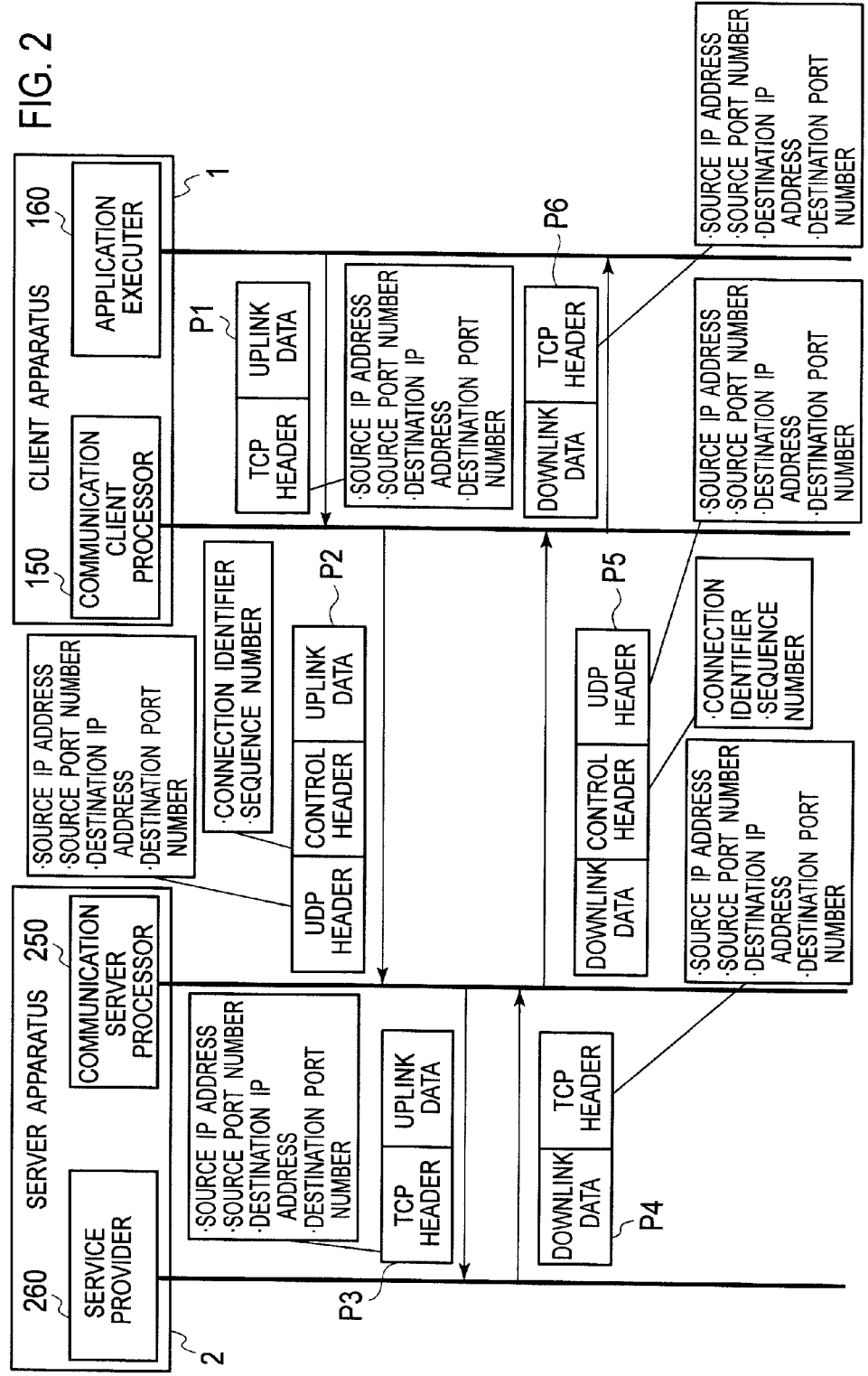
FIG. 2 is a diagram illustrating the configurations of packets transmitted and received in the communication system according to the embodiment of the present invention.

The client apparatus 1 according to the embodiment of the present invention includes the communication client processor 150 and the application executer 160 inside the client apparatus 1, as shown in FIG. 2.

Figure 14:
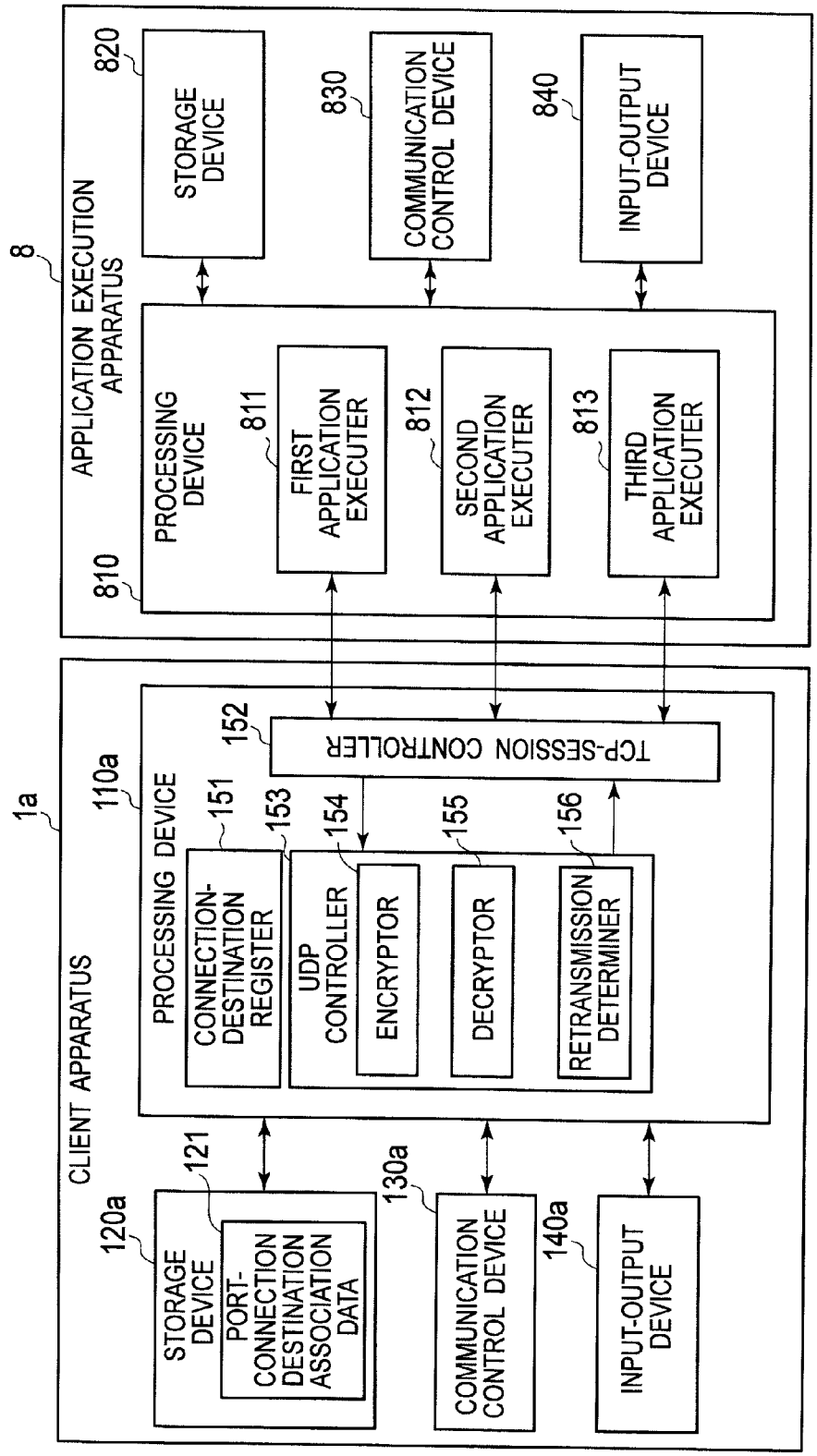
FIG. 14 is a diagram illustrating the hardware configurations and functional blocks of a client apparatus and an application execution apparatus according to the modification of the present invention.

In contrast, the client apparatus 1a according to the modification of the present invention differs in that it is used while being connected to an application execution apparatus 8. As shown in FIG. 14, the client apparatus 1a includes each of parts and the data of the communication client processor 150 shown in FIG. 3, whereas the application execution apparatus 8 includes each of parts and the data of the application executer 160 shown in FIG. 3.

Specifically, in the client apparatus 1 according to the embodiment of the present invention, the communication client processor 150 and the application executer 160 communicate with each other inside a single apparatus via a TCP connection. In contrast, in the modification, the client apparatus 1a and the application execution apparatus 8 are installed as individual apparatuses and communicate with each other via a TCP connection.

In such a modification, the server apparatus 2 holds the identifier "ID_C" given to the client apparatus 1a and the address and the port number of the node which the client apparatus 1a connects to in association with each other.

As described above, the application execution apparatus and the client apparatus 1a, which implements the communication method according to the embodiment of the present invention, can be provided in different housings.

Other Embodiments

Although an embodiment and a modification of the present invention have been described above, it should not be understood that the statement and the drawings constituting part of this disclosure limit this invention. Various alternative embodiments, examples, and operation techniques will become apparent to those skilled in the art from this disclosure.

The present invention of course includes various embodiments and the like which are not described herein. Therefore, the technical scope of the present invention is determined solely by the matters specifying the invention according to the claims that are considered appropriate from the foregoing description.

What is claimed is:

1. A communication method used for a communication system including a client apparatus connecting to a communication network via a first node, a server apparatus connecting to the communication network via a second node, and an address management apparatus connecting to the communication network, the client apparatus including an application executer configured to execute an application and a communication client processor configured to relay communication of the application, the server apparatus including a service provider configured to provide a service for the application and a communication server processor configured to relay communication of the service, the communication method comprising:

causing the communication client processor of the client apparatus to transmit a client identifier to the address management apparatus via the first node;

causing the communication server processor of the server apparatus to transmit a server identifier to the address management apparatus via the second node;

causing the address management apparatus to store, in a storage device, address translation data in which the client identifier and an IP address and an UDP port of the first node are associated with each other and the server identifier and an IP address and an UDP port of the second node are associated with each other;

causing the communication client processor of the client apparatus to, upon receipt of a TCP connect from the application executer, transmit the server identifier to the address management apparatus and acquire the IP address and the UDP port of the second node, which are associated with the server identifier;

enabling a UDP connection between the communication client processor of the client apparatus and the communication server processor of the server apparatus via the first node and the second node;

causing the communication client processor of the client apparatus to transmit a connection request to the server apparatus via the UDP connection;

causing the communication server processor of the server apparatus to, upon receipt of the connection request via the second node, transmit a TCP connect to the service provider, receive an Ack from the service provider, and transmit a connection response containing the Ack and a connection identifier to the first node via the UDP connection;

causing the communication client processor of the client apparatus to transmit the Ack and the connection identifier to the application executer upon receipt of the connection response from the communication server processor of the server apparatus via the first node; and establishing a first TCP connection identified by the connection identifier between the communication client processor and the application executer of the client apparatus and establishing a second TCP connection identified by the connection identifier between the communication server processor and the service provider of the server apparatus.

2. The communication method according to claim 1, further comprising:

causing the communication server processor of the server apparatus to attach a control header containing the connection identifier to downlink data and transmit the downlink data with the control header to the communication client processor of the client apparatus via the UDP connection; and causing the communication client processor of the client apparatus to transmit the downlink data to the application executer via the first TCP connection, attach a control header containing the connection identifier to an acknowledgement of reception of the downlink data, and transmit the reception acknowledgement with the control header to the communication server processor of the server apparatus via the UDP connection.

3. The communication method according to claim 2, further comprising, when the client apparatus connects to a third node:
causing the communication client processor of the client apparatus to transmit the client identifier to the address management apparatus via the third node;
causing the address management apparatus to store, in the storage device, address translation data in which the client identifier and an IP address and an UDP port of the third node are associated with each other;
causing the communication server processor of the server apparatus to transmit the client identifier to the address management apparatus and acquire the IP address and the UDP port of the third node, which are associated with the client identifier, if the communication server processor of the server apparatus does not receive the reception acknowledgement from the communication client processor of the client apparatus after transmitting the downlink data;
enabling a new UDP connection between the communication client processor of the client apparatus and the communication server processor of the server apparatus via the third node and the second node; and
causing the communication server processor of the server apparatus to attach a control header containing the connection identifier to the downlink data and transmit the downlink data with the control header to the communication client processor of the client apparatus via the new UDP connection.

4. The communication method according to claim 2, further comprising:
causing the communication server processor of the server apparatus to encrypt the downlink data and transmit the encrypted downlink data to the communication client processor of the client apparatus; and
causing the communication client processor of the client apparatus to decrypt the encrypted downlink data and transmit the decrypted downlink data to the application executer.

5. The communication method according to claim 2, further comprising:
in a case of dividing the downlink data into a plurality of packets and transmitting the packets, causing the communication server processor of the server apparatus to put sequence numbers in the control headers of the packets, the sequence numbers identifying an order of the respective packets; and
causing the communication client processor of the client apparatus to sequentially receive the plurality of packets and, if an unreceived packet is present, transmit the sequence number of the unreceived packet to the communication server processor of the server apparatus to request retransmission.

6. A communication system comprising:
a client apparatus connecting to a communication network via a first node;
a server apparatus connecting to the communication network via a second node; and
an address management apparatus connecting to the communication network,
wherein the client apparatus includes an application executer configured to execute an application and a communication client processor configured to relay communication of the application,
the server apparatus includes a service provider configured to provide a service for the application and a communication server processor configured to relay communication of the service,
the communication client processor of the client apparatus includes
a connection-destination register configured to transmit a client identifier to the address management apparatus via the first node and causes the address management apparatus to associate the client identifier and an IP address and an UDP port of the first node with each other,
a UDP controller configured to
upon receipt of a TCP connect from the application executer, transmit a server identifier to the address management apparatus and acquire an IP address and an UDP port of the second node which are associated with the server identifier,
after a UDP connection is established between the communication client processor of the client apparatus and the communication server processor of the server apparatus via the first node and the second node, transmit a connection request to the server apparatus via the UDP connection, and
receive a connection response containing an Ack for the TCP connect and a connection identifier from the communication server processor of the server apparatus via the first node, and
a TCP-session controller configured to transmit the Ack and the connection identifier to the application executer to establish a first TCP connection identified by the connection identifier between the communication client processor and the application executer, and
the communication server processor of the server apparatus includes
a connection-destination register configured to transmit the server identifier to the address management apparatus via the second node and cause the address management apparatus to associate the server identifier and the IP address and the UDP port of the second node with each other,
a UDP controller configured to, upon receipt of the connection request via the second node after the UDP connection is enabled between the communication server processor of the server apparatus and the communication client processor of the client apparatus via the first node and the second node, transmit a TCP connect to the service provider, receive an Ack from the service provider, and transmit a connection response containing the Ack and the connection identifier to the first node via the UDP connection, and
a TCP-session controller configured to establish a second TCP connection identified by the connection identifier between the communication server processor and the service provider.

7. The communication system according to claim 6, wherein
the UDP controller of the communication server processor attaches a control header containing the connection identifier to downlink data and transmit the downlink data with the control header to the communication client processor of the client apparatus via the UDP connection, and the UDP controller of the communication client processor transmits the downlink data to the application executer via the first TCP connection, attach a control header containing the connection identifier to an acknowledgement of reception of the downlink data, and transmits the reception acknowledgement with the control header to the communication server processor of the server apparatus via the UDP connection.

8. The communication system according to claim 7, wherein when the client apparatus connects to a third node,
the connection-destination register of the communication client processor transmits the client identifier to the address management apparatus via the third node and causes the address management apparatus to associate the client identifier and an IP address and an UDP port of the third node with each other, the UDP controller of the communication server processor transmits the client identifier to the address management apparatus and acquires the IP address and the UDP port of the third node, which are associated with the client identifier, if the UDP controller of the communication server processor does not receive the reception acknowledgement from the communication client processor of the client apparatus after transmitting the downlink data, and after a new UDP connection is enabled between the communication client processor of the client apparatus and the communication server processor of the server apparatus via the third node and the second node, the UDP controller of the communication server processor attaches a control header containing the connection identifier to the downlink data and transmit the downlink data with the control header to the communication client processor of the client apparatus via the new UDP connection.

9. The communication system according to claim 7, wherein the UDP controller of the server apparatus encrypts the downlink data and transmits the encrypted downlink data to the communication client processor of the client apparatus, and the UDP controller of the communication client processor decrypts the encrypted downlink data and transmits the decrypted downlink data to the application executer.

10. The communication system according to claim 7, wherein:

in a case of dividing the downlink data into a plurality of packets and transmitting the packets, the UDP controller of the communication server processor puts sequence numbers in the control headers of the packets, the sequence numbers identifying an order of the respective packets, and the UDP controller of the communication client processor sequentially receives the plurality of packets and, if an unreceived packet is present, transmits the sequence number of the unreceived packet to the communication server processor of the server apparatus to request retransmission.

11. A communication method used for a communication system including a client apparatus connecting to a communication network via a first node, an application execution apparatus connecting to the client apparatus, a server apparatus connecting to the communication network via a second node, and an address management apparatus connecting to the communication network, the application execution apparatus including an application executer configured to execute an application, the client apparatus including a communication client processor configured to relay communication of the application, the server apparatus including a service provider configured to provide a service for the application and a communication server processor configured to relay communication of the service, the communication method comprising:

causing the communication client processor of the client apparatus to transmit a client identifier to the address management apparatus via the first node;

causing the communication server processor of the server apparatus to transmit a server identifier to the address management apparatus via the second node;

causing the address management apparatus to store, in a storage device, address translation data in which the client identifier and an IP address and an UDP port of the first node are associated with each other and the server identifier and an IP address and an UDP port of the second node are associated with each other;

causing the communication client processor of the client apparatus to, upon receipt of a TCP connect from the application executer, transmit the server identifier to the address management apparatus and acquire the IP address and the UDP port of the second node, which are associated with the server identifier;

enabling a UDP connection between the communication client processor of the client apparatus and the communication server processor of the server apparatus via the first node and the second node;

causing the communication client processor of the client apparatus to transmit a connection request to the server apparatus via the UDP connection;

causing the communication server processor of the server apparatus to, upon receipt of the connection request via the second node, transmit a TCP connect to the service provider, receive an Ack from the service provider, and transmit a connection response containing the Ack and a connection identifier to the first node via the UDP connection;

causing the communication client processor of the client apparatus to transmit the Ack and the connection identifier to the application executer upon receipt of the connection response from the communication server processor of the server apparatus via the first node; and establishing a first TCP connection identified by the connection identifier between the communication client processor of the client apparatus and the application executer and establishing a second TCP connection identified by the connection identifier between the communication server processor and the service provider of the server apparatus.

12. A communication system comprising:
a client apparatus connecting to a communication network via a first node;
an application execution apparatus connecting to the client apparatus;
a server apparatus connecting to the communication network via a second node; and
an address management apparatus connecting to the communication network,
wherein the application execution apparatus includes an application executer configured to execute an application, the client apparatus includes a communication client processor configured to relay communication of the application, the server apparatus includes a service provider configured to provide a service for the application and a communication server processor configured to relay communication of the service, the communication client processor of the client apparatus includes
- a connection-destination register configured to transmit a client identifier to the address management apparatus via the first node and causes the address management apparatus to associate the client identifier and an IP address and an UDP port of the first node with each other,
- a UDP controller configured to
  - upon receipt of a TCP connect from the application executer, transmit a server identifier to the address management apparatus and acquire an IP address and an UDP port of the second node which are associated with the server identifier,
  - after a UDP connection is established between the communication client processor of the client apparatus and the communication server processor of the server apparatus via the first node and the second node, transmit a connection request to the server apparatus via the UDP connection, and
  - receive a connection response containing an Ack for the TCP connect and a connection identifier from the communication server processor of the server apparatus via the first node, and
- a TCP-session controller configured to transmit the Ack and the connection identifier to the application executer and establishes a first TCP connection identified by the connection identifier between the communication client processor and the application executer, and the communication server processor of the server apparatus includes
- a connection-destination register configured to transmit the server identifier to the address management apparatus via the second node and cause the address management apparatus to associate the server identifier and the IP address and an UDP port of the second node with each other,
- a UDP controller configured to, upon receipt of the connection request via the second node after the UDP connection is enabled between the communication server processor of the server apparatus and the communication client processor of the client apparatus via the first node and the second node, transmit a TCP connect to the service provider, receive an Ack from the service provider, and transmit a connection response containing the Ack and the connection identifier to the first node via the UDP connection, and
- a TCP-session controller configured to establish a second TCP connection identified by the connection identifier between the communication server processor and the service provider.

\* \* \* \* \*